United States Patent
Smith et al.

(10) Patent No.: US 6,282,564 B1
(45) Date of Patent: Aug. 28, 2001

(54) METHOD, SYSTEM AND APPARATUS FOR EXCHANGING STORED INFORMATION BETWEEN A SERVER AND CUSTOMER PREMISES EQUIPMENT

(75) Inventors: Anthony Hamilton Smith; Leonard George Bleile, both of Calgary (CA)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 08/933,753

(22) Filed: Sep. 23, 1997

(51) Int. Cl.[7] .............................. G06F 13/00; G06F 13/38; G06F 15/17

(52) U.S. Cl. ..................... 709/206; 709/228; 709/230; 709/237

(58) Field of Search .................. 709/206, 228, 709/230, 237; 340/825.44; 379/88.15, 93.24; 455/426, 462, 466

(56) References Cited

U.S. PATENT DOCUMENTS

| | | | |
|---|---|---|---|
| 5,742,905 | * | 4/1998 | Pep et al. ............................. 455/461 |
| 5,809,415 | * | 9/1998 | Rossmann ........................... 455/422 |
| 5,826,034 | * | 10/1998 | Albal .................................. 709/240 |
| 5,987,100 | * | 11/1999 | Fortman et al. .................... 379/88.14 |
| 5,991,292 | * | 11/1999 | Focsaneanu et al. ............... 370/352 |

OTHER PUBLICATIONS

Newton's Telecom Dictionary.*

Schwartz et al., "Dual-media messaging using screen telephones on the telephone network", Technical Conference Record, IEEE International Conference on Communications, pp. 1183–1188 vol. 2, May 1993.*

Richman et al., "BT screenphone services in the UK", Fifth IEEE Conference on Telecommunications, pp. 155–159, Mar. 1994.*

* cited by examiner

*Primary Examiner*—Mark H. Rinehart
*Assistant Examiner*—Almari Romero
(74) *Attorney, Agent, or Firm*—Cobrin & Gittes

(57) ABSTRACT

An apparatus for communicating information. The apparatus comprises memory and a transmitter. The memory stores information in a data record having pre-defined information fragments and identification fields associated with respective information fragments for identifying respective information fragments. The transmitter transmits the information fragments and identifications of the information fragments in respective messages. A receiver operable to receive the messages transmitted by the transmitter reconstructs the data record.

48 Claims, 20 Drawing Sheets

Structure of extended ADSI STA Signal

| Signal Byte 1 | Signal Byte 2 | Signal Byte 3 | Signal Byte 4 | Signal Byte 5 | Signal Byte 6 | Signal Byte 7 | Signal Byte 8 | ... | Signal Byte 255 |
|---|---|---|---|---|---|---|---|---|---|
| 151d | $XX | "M" | "E" | "S" | "G" | $XX | $XX | ... | $XX |
| STA Parameter | Data Length | Application Name | | | | Action Code | Action Code Data Byte 1 | ... | Action Code Data Byte 248 |

Figure 3

Set of Extended STA Codes Beginning with:
<$1d> <STA signal length> <"M"> <"E"> <"S"> <"G">

| ACTION CODE | DATA | | | | OPERATION |
|---|---|---|---|---|---|
| null | null | | | | null |
| $1B | data length | data | | | QUERY: Is CPE configured to run the data transfer application? |
| $01 | data length | data | | | QUERY: Does CPE have sufficient memory available to download specified data record? |
| $02 | data length | data | | | COMMAND: Download destination address. |
| $03 | data length | 1st datum length 1st datum | ... | m th datum length m th datum | COMMAND: Download source address. |
| | | | | | COMMAND: Download distribution list address. |
| $04 | data length | data | | | COMMAND: Download message body. |
| $05 | data length | data | | | COMMAND: Download message body extension. |
| $06 | data length | data | | | COMMAND: Download message receipt time. |
| $07 | data length | data | | | COMMAND: Download message subject. |
| $1D | data length | null | | | NOTIFICATION: Download complete. |
| $11 | data length | null | | | QUERY: How many CPE resident messages need to be uploaded to the CO server? |
| $08 | modem protocol | null | | | COMMAND: Engage modem at specified baud rate pursuant to TAP protocol. |

Figure 4

METHOD, SYSTEM AND APPARATUS FOR EXCHANGING STORED INFORMATION BETWEEN A SERVER AND CUSTOMER PREMISES EQUIPMENT

FIELD OF THE INVENTION

This invention relates to the exchange of stored information between a Stored Program Computer System (SPCS), such as located at a telephone company central office or elsewhere, and Cutomer Premises Equipment (CPE), such as an appropriately enabled telephone.

BACKGROUND OF THE INVENTION

Electronic mail or e-mail is a communication scheme which has acquired increasing acceptance due to its use on personal computers. Paging has been common in connection with wireless paging systems and has involved the transmission of small, simple messages. Telephones have traditionally been used to communicate audio signals between users. The integration of audio signals and message signals has, to come extent, been provided by eqipment employing an analogue display services interface (ADSI) protocol. Such protocol was established to enable a stored program computer system (SPCS) to remotely control a visual display device such as liquid crystal display (LCD) included in customer premises equipment (CPE). The ADSI protocol has provided for certain extensions which allow users to employ the protocol for features other than simply controlling a visual display device. However, none has been used to communicate e-mail and pages.

Manufacturers such as Uniden and Phillips have attempted to provide data transfer functionality between an SPCS and customer premises equipment, however, these typically use a high speed data mode which requires synchronization time and can have a net effect of being slow as seen by the user. In addition, equipment to facilitate the use of such a data mode can be expensive.

As the ADSI protocol has already provided for communication between an SPCS and customer premises equipment, use of the ADSI protocol extension for e-mail and paging is desirable as systems are already in place to communicate messages according to the ADSI protocol. What would be desirable, therefore, would be a device which uses extensions to the ADSI protocol to allow a telephone user to send and receive pages and e-mails at a telephone, in conjunction with a messaging platform. Freferably, an SPCS can query customer premises equipment to determine whether or not it has room to store an e-mail or page, an SPCS can download an e-mail or page, and an SPCS can query customer premises equipment to see it is has a message to be uploaded. In addition, preferably an SPCS can signal customer premises equipment to assume a high speed data mode which uses a high speed data transfer protocol to upload information from the CPE to the SPCS, when desired. The present invention addresses these and other needs.

SUMMARY OF THE INVENTION

In accordance with one aspect of the invention, there is provided an apparatus for communicating information. The apparatus comprises memory and a transmitter. The memory is for storing information in a data record having pre-defined information fragments and identification fields associated with respective fragments for identifying the respective record fragments. The transmitter is for transmitting the information fragments and identifications of the information fragments in respective messages.

Preferably, the transmitter is operable to transmit the message is compliance with at least one ADSI protocol extension.

Preferably, the transmitter is operable to transmit a query message to query whether or not a receiving device is ready to receive messages and preferably, the transmitter is operable to tramsit a query message to query whether or not the receiving device is complaint with an ADSI protocol extension.

It is desirable that the apparatus invlude a receiver operable to receive an acknowledgement signal, the transmitter transmitting the messages in response to receipt of the acknowledgement signal.

Preferably, the receiver is operable to receive an acknowledgement signal before enabling the transmitter to transmit a subsequent message.

Preferably, the memory is operable to store an electronic mail message in the data record and/or operable to store a page message in the data record.

Preferably, the message transkitter is operable to transmit the messages on a public telephone network.

In accordance with another aspect of the invention, there is provided an apparatus for receiving inforamtion. The apparatus includes a receiver and a processor. The receiver is for receinging messages having information fragments and identifcations for identifying the information fragements. The processor is for producing a data record including the identifications and the ifnroamtion fragments.

Preferably, the receiver is operable to receive the receive messages in compliance with at least one pre-defined ADSI protocol extension.

Preferably, the apparatus includes a transmitter for transmitting a dual tone multi-frequency signal in responce to receipt of at least one message.

Preferably, the receiver is operable to receive messages at customer premises equipment in a public telephone network.

In one embodiment, the receiver is operable to receive download complete message, to confirm that the information fragments received comprise all information fragments of the record and to signal the transmitter to transmit a pre-defined signal in response thereto.

It is desirable that the apparatus includes non-volatile memory for storing a record contain the information fragments.

Preferably, the transmitter is operable to transmit a signal when the receive message meets a pre-defined criteria.

In accordance with another asepct of the invention, there is provided an apparatus for providing e-mail and paging services to customer premises equipment. The apparatus includes memory, a transmitter, receiver and a processor. The memory is for storing at least one of e-mail and page information in a stored program computer system data record having pre-defined information fragments and identification fields associated with respective information fragments for identifying the respective record fragments. The transmitter is for transmitting the information fragments and identifications of the inforamtion fragments in respective messages, to customer premises equipment. The receiver is for receiving messages at the customer premises equipment. The processor is for reconstructing the stored program computer system data record at the customer. premises equipment, from the information fragments and identifications thereof.

Preferably, the apparatus includes memory at the CPE, a transmitter at the CPE, a receiver at the SPCS and a processor at the SPCS. The memory at the CPE is for storing at the customer premises equipment at least one of e-mail and page information in a CPE data record having pre-defined information fragments and identification fields associated with respective information fragments for identifying the respective information fragments. The transmitter at the CPE is for transmitting the information fragments and identifications thereof in respective messages, to the stored program computer system. The receiver is for receiving the messages at the SPCS. The processor is for reconstructing the CPE data record at the stored program computer system.

Preferably, the transmitters are operable to transmit messages on a public telephone network.

Preferably, the transmitters are operable to transmit the messages in compliance with at least one ADSI protocol extension.

It is desirable that the transmitter at the CPE is operable to transmit an acknowledgement signal from the CPE to the stored program computer system in response to successful receipt of the message and preferably, the transmitter at the CPE is operable to transmit a dual tone multi-frequency signal as the acknowledgement signal.

In accordance with another aspect of the invention, there is provided a method of communicating information. The method includes the steps of:
  a) storing said information in a data record having pre-defined information fragments and identification fields associated with respective fragments for identifying aid respective information fragments;
  b) transmitting said information fragments and identifications of said information fragments in respective messages.

In accordance with another aspect of the invention, there is provided a method of receiving information. The method includes the steps of:
  a) receiving messages having information fragments and identifications of said information fragments; and
  b) producing a data record including said identifications and said information fragments from respective said messages.

In accordance with another aspect of the invention, there is provided a method of providing e-mail and paging services to customer premises equipment. The method icnludes the steps of:
  a) storing at leasting one of e-mail and page infromation in a stored program computer system data record having pre-defined information fragments and identification fields associated with respective information fragments for identifying said respective information fragments;
  b) transmitting said information fragments and identifications of said information fragments in respective messages, to customer premises equipment.
  c) receiving said messages at said customer premises equipment; and
  d) reconstructing said stored program computer system data record at said customer premises equipment, from the ifnroamtion fragments and identifications thereof.

BRIEF DESCRIPTION OF THE DRAWINGS

In drawings which illustrate embodiments of the invention,

FIG. 3 is a tabular representation of a Switch to Application (STA) message format for transmitting messages between as SPCS and a CPE, according to the first embodiment of the invention;

FIG. 4 is a tabulation of a set of action codes and related messages for use in the message format shown in FIG. 3;

DETAILED DESCRIPTION

FIG. 1

Figure 1:
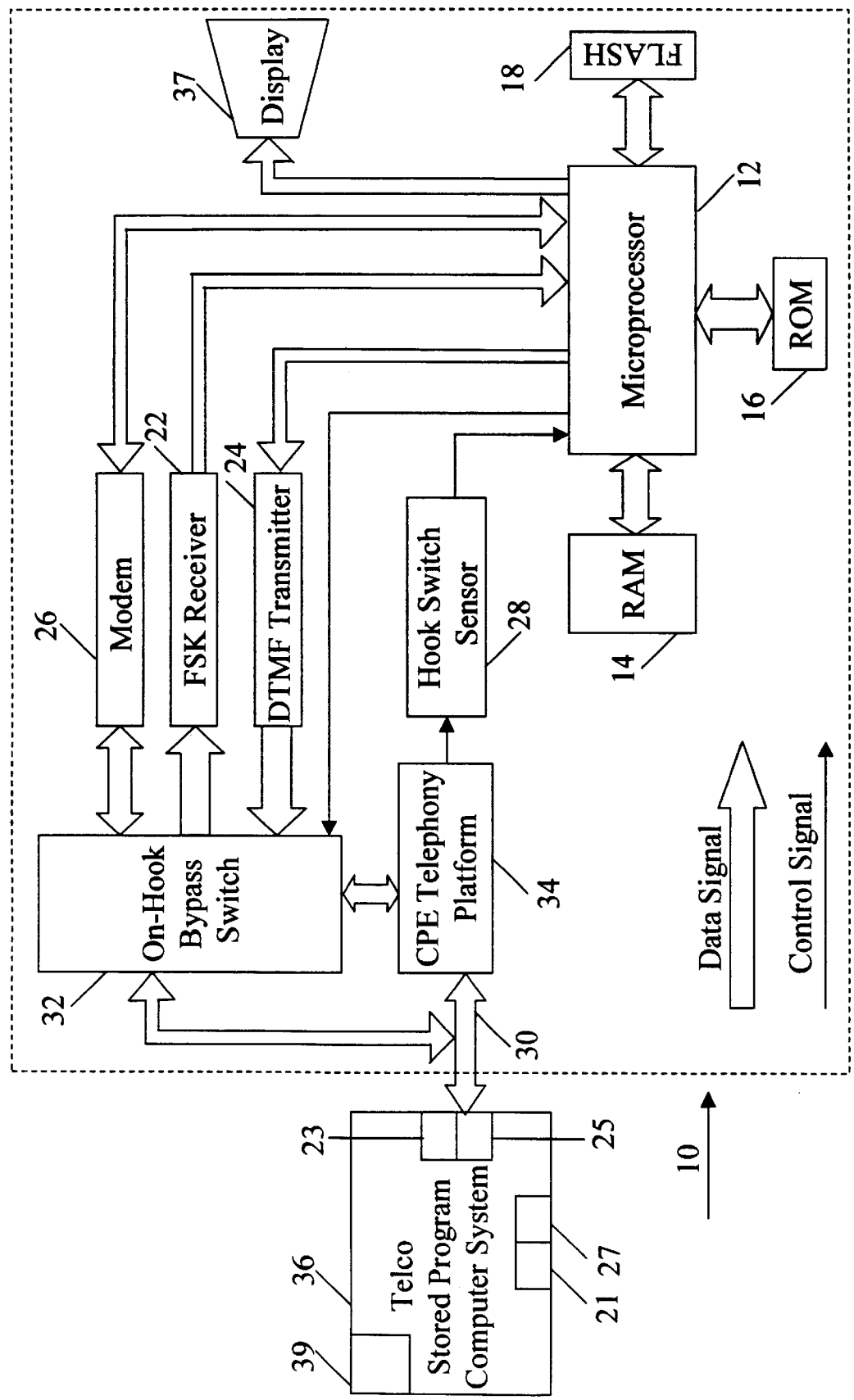
FIG. 1 is a block diagram of Cutomer Premises Equipment (CPE) including circuitry enabling it to exchange stored data with a stored program computer system (SPCS), according to a first embodiment of the invention.

Referring to FIG. 1, an apparatus for providing e-mail and paging services on a public telephone network 30 includes a stored program computer system 36 and customer premises equipment 10.

Stored Program Computer System

The SPCS 36 includes a first processor 21, a first transmitter 23, a first receiver 25 and memory 27. The first processor 21 is operable to run or interact with a messaging platform for receiving e-mail or page messages to produce a data record relating to the e-mail or page message.

Customer Premises Equipment

The Customer Premises Equipment (CPE) includes a microprocessor 12, and memory including Random Access Memory (RAM) 14, Read Only Memory (ROM) 16, and non-volatile random acces memory 18, in this embodiment Flash EEPROM (FLASH), all connected to be controlled by and to exchange data with the microprocessor 12. It has been found that the Mitsubishi 37702 16-bit microprocessor having 2 K of RAM and 32 K of ROM on-chip, with conventional address and data buses is suitable as the microprocessor 12. It has also been found that AMD 29040 Flash EEPROM is suitable as the FLASH 18. The RAM 14 and the ROM 16 are conventional.

The CPE 10 further includes a Frequency Shift Key (FSK) decoder 22, a Dual Tone Multi Frequency (DTMF) transmitter 24, and a modem 26, each of which is addressable and in communication with the microprocessor 12.

A conventional hook switch sensor 28 is connected to provide an off-hook signal to the microprocessor 12 to indicate whether or not a CPE handset (not shown) is on or off hook.

The CPE 10 further includes an on-hook bypass switch 32 and a CPE telephony platform 34. The on-hook bypass switch is in communication with the microprocessor 12, the FSK decoder 22 and the DTMF transmitter 24 and the modem 26. The on-hook bypass switch is further in communication with a stored program computer system (SPCS) 36 connected to the CPE 10 by way of a conventional public telephone network 30.

The CPE telephony platform 34 includes conventional telephony circuitry for connecting a telephone to the public telephone network 30 and incudes a signal output for providing a signal to the hook switch sensor to indicate to the hook switch sensor when the CPE telephony platform is connected to the public telephone network 30. In addition, the CPE telephony platform is in communication with the on-hook bypass switch 32 such that the microprocessor 12 can selectively communicate with the public telephone network 30 directly through the on-hook bypass switch 32 or via the CPE telephony platform 34. In this embodiment, the CPE includes a messaging platform which also directs the CPE processor 12 to produce a data record, like the one produced by the SPCS 36.

The SPCS 36 and the CPE 10 both comply iwth a standard ADSI protocol such that the SPCS 36 may transmit data according to this protocol for visual display at the CPE 10 on a display screen including a liquid crystal display 37 in communication with the microprocessor 12. Generally, messages from the SPCS 36 are communicated to the microprocessor 12 via the FSK decoder 22 while messages from the microprocessor 12 are conveyed to the SPCS 36 via the DTMF transmitter 24. Messages my be uploaded from the CPE 10 to the SPCS 36 via the modem 26 for higher speed data transfer.

Data Record

Data records are produced by the first processor 21 in response to an e-mail or page messaging platform and by the CPE processor.

FIG. 2

Figure 2:
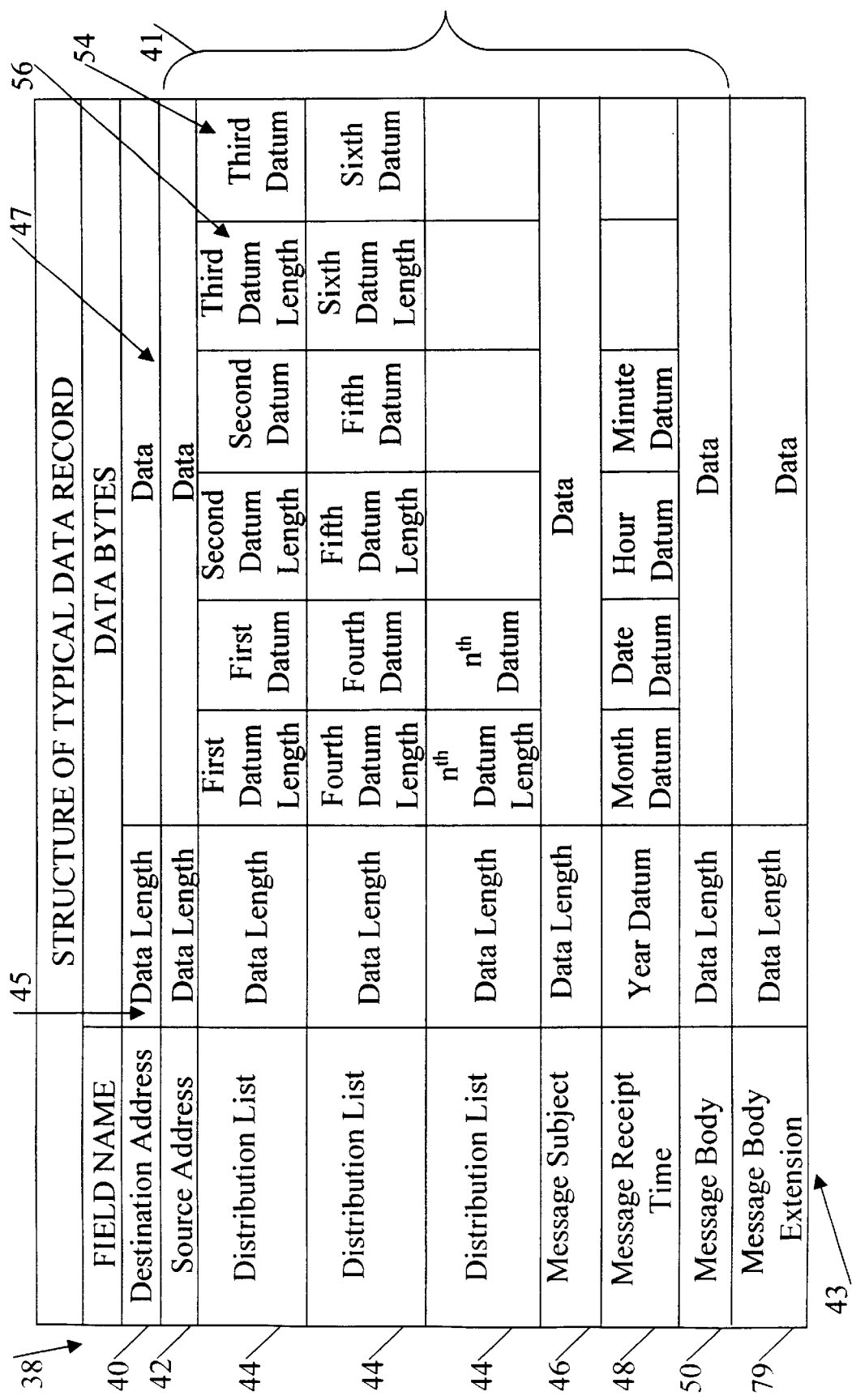
FIG. 2 is a tabular representation of a data record structure adapted to be stored and exchanged between the SPCS and the CPE, according to the first embodiment of the invention.

Refering to FIG. 2, a data record is shown generally at 38 and includes a plurality of lines 41 of predefined record fragments.

In this embodiment, the lines include a destination address line 40, a source address line 42, first, second and third distribution list lines 44, a message subject line 46, a message receipt time line 48 and a message body line 50 and a message vody extension line 19. Generally each line has an identification field shown generally at 43, a data length field 45 and an information fragment field 47. The identification fields are associated with respective fragments and identifying respective information fragments. The data length fields identifying the number of bytes in corresponding respective information fragments.

In this embodiment, the information fragment fields of the destination and source address lines have a maximum data length of 64 bytes. The information fragment field of the distribution list line is used to store destination addresses and corresponding lengths of those destination addresses of each recipient of the record of a plurality of messages and therefore, this field can have a length which is a multiple of the maximum data length of the information fragment field of the message subject line 46 has a maximum length of 40 bytes, the information fragment field of the message receipt time line 48 has a maximum data length of 12 bytes and the information fragment of the message body line 50 has a maximum data length of 248 bytes. A plurality of message body lines may be included in the data record and these appear as message body extension lines 19.

The information fragment field of the destination address line is used to store a destination address of the intended recipient of the record. The information fragment field of the source address line is used to store a source address of the originator of the message. The information fragments field of the distribution list line is used to store length/datum pairs representing lengths and data defining a plurality of destination addresses, for use when the record is to be transmitted to a plurality of recipients. The information fragment field of the message subject line is used to store a character string identifying the subject of the record. The information fragment field of the message receipt time line is used to store year, month, day, hour and minute information identifying when the record was first stored in memory, ie., received, and finally, the information fragment of the message body line is used to store a character string representing a message, for example, "let'go boating", which is the information to be conveyed from the person originating the message to the intended recipient of the message. All data is encoded according to the ASCII code except for the length data, which is encoded in binary.

It should be understood that a record 38 may contain more than one distribution list line 44 and more than one body line 50 but only one instance of each other type of line 40, 42, 46, 48. The distribution list line 44 and body line 50 may be large, in which case multiple lines, with data blocks no longer than 248 bytes are used.

FIG. 3

Referring to FIG. 3, the ADSI protocol includes a protocol extension shown generally at 58, which is used to indicate to a receiving device that a "switch to application" (STA) message is to follow. The ADSI protocol extension includes an STA parameter byte 60 predetermined to be 151d. It further includes a data length byte 62 which identifies number of bytes of the message. It further includes first, second, third and fourth application name bytes 64–70 to indicate an application name identifying an application with which data to follow is compatible. The ADSI protocol extensiuon further includes application data which, in this embodiment, includes an action code byte 72 for identifying an action code associated with the application identified and further includes a plurality of bytes identified as data fields 74, including 248 bytes (8–255) for communicating action code data associated with the application identified.

The SPCS 36 shown in FIG. 1 employs the extended ADSI specification shown in FIG. 3 to transmit to the CPE 10 shown in FIG. 1, a plurality of messages for communicating the data record shown generally at 38 in FIG. 2 to the CPE 10 shown in FIG. 1. As part of this communication, the action code byte 72 shown in FIG. 3, is used to send queries, commands or notifications to the CPE. Such queries, commands and notifications are shown in FIG. 4 and include specific codes for identifying the various queries, commands and notifications used in this embodiment.

The various queries, commands and notifications incude columns identified as action code 72 and data 74. The contents of the action code byte 72 are used in the action code byte 72 of the ADSI protocol extension shown in FIG. 3 and the contents of the data column are used in the data fields 74 of the ADSI protocol extension shown in FIG. 3, when transmitting messages to the CPE 10.

The action codes relate to a "CPE configured" query 78 identified by a null action code and associated with null data.

This query queries the CPE to determine whether or not it is configured to run a data transfer application.

A "sufficient memory" query 80 is associated with action code $1B and includes two data field portions including a data length portion and a data portion. The sufficient memory query queries the CPE to determine whether it has sufficient memory available to download a data record.

A "download destination address" command 82 is associated with action code $01 and has a data length field portion and data portion as described in connection with the sufficient memory query. The download destination address command is used to download to the CPE the information fragment of the destination address line of the data record shown in FIG. 2.

A "download source" command 84 is associated with action code $02 and has data length and data field portions as described in connection with the download destination address command 82. The download source command is used to download to the CPE the information fragment associated with the source address line of the data record shown in FIG. 2.

A "download distribution address" command 86 is identified by action code $03 and includes a data length field similar to that of the download source command 84 but includes a plurality of datum length and datum fields corresponding to distribution address identifications and distribution list addresses. This command is used to download to the CPE the information fragment associated with distribution list line of the data record shown in FIG. 2.

A "message body" command 88 is associated with action code 04 and includes a data length and data field as described in connection with the download source command 84. This command is used to download to the CPE the information fragment associated with the message body line of the data record shown in FIG. 2.

A "message body extension" command 90 is associated with action code $05 and includes data length and data fields as described in connection with the message body command 88. The message body extension command is used to download to the CPE the information fragments associated with message body extension lines of the data record shown in FIG. 2.

A "message receipt time" command 92 is identified by action code $06 and includes a single data field. The message receipt time command 92 is used to download to the CPE the information fragment associated with the message receipt time line of the data record shown in FIG. 2.

A "download message" command 94 is associated with action code $07 and includes a data length field and a data field as described in connection with the message body extension command 90. The dwnload message command 94 is used to download to the CPE the information fragment associated with the message subject line of the data record shown in FIG. 2.

A "download complete" notification 96 is identified by action code $1d and includes a data length field and a null field. This is used to provide a "download complete" message to the CPE.

An "upload query" 98 is associated with action code $11 and includes a data length field and a null field. The upload query is used to query the CPE to determine how many resident messages need to be uploaded to the SPCS.

An engage modem command 100 is identified by action code $08 and includes a modem protocol field and a null field. The engage modem command is used to indicate to the CPE that the modem is to be engaged at a specified baud rate pursuant to the Telocator Alphanumeric Paging protocol (TAP).

In summary a user enters an e-mail or page message using an e-mail or paging system, in communication with the stored program computer system 36 shown in FIG. 1. The stored program computer system stores the message in memory 39, in the format indicated generally at 38 in FIG. 2. The stored program computer system then addresses each line of the data record and sends the associated information fragment to the CPE in a respective message of the format shown in FIG. 3. Thus, respective information fragments on lines of the record are transmitted to the CPE in respective messages. The above queries, commands and notification 78–100 act as identification fields for identifying respective information fragments in the messages.

For example, to send the information fragment of the destination address line 40 shown in FIG. 2, the stored program computer system loads into a transmit buffer (not shown), a first byte containing the STA parameter "151d" to identify the message as being part of the ADSI protocol extension. It then reads the data length field 45 associated with the destination address line 40 and adds 6 to this value to represent the number of bytes comprised of bytes 2–7 in the extended ADSI message and bytes 8-n of the data portion of the message as specified by the information fragment field 47 of the destination address line 40. This number is then stored as a second byte in the transmit buffer, representing the data length field of the ADSI protocol extension shown in FIG. 3.

The stored program computer system then applies the contents of the destination address field 43 to a look-up table (not shown) to determine the action code associated with destination address, which is this embodiment is $01, as seen in connection with the first download destination address command 82 shown in FIG. 4. The action code $01 is then loaded into the transmit buffer at a location associated with the action code byte 72 of the ADSI protocol extension and the information fragment field 47 of the destination address line 40 is loaded into the transmit buffer at locations associated with the data fields 74.

The contents of the transmit buffer are then transmitted, by the transmitter 23, as a transmit message, to the CPE, in an FSK format, over the public telephone network 30.

Thus, processor in the SPCS stores e-mail or page messages in a data record in memory. The data record has predefined information fragments and identification fields associated with respective information fragments or identifying respective information fragments. The information fragments and identifications of the information fragments are then transmitted in respective messages having message identifiers for identifying the messages as relating to the data record.

Receipt of message at CPE

The transmit message is received at the on-hook bypass switch 32 and is forwarded to the FSK decoder 22 for decoding into signals readable by the microprocessor 12. Thus, the on-hook bypass switch, the FSK decoding and the microprocessor act as a receiver for receiving messages having information fragments and identifications of said information fragments. After the signals are decoded into digital signals readable by the microprocessor, they are stored in the RAM 14. The transmit message is stored in the RAM and is henceforth referred to as a received message.

FIG. 5

Figure 5:
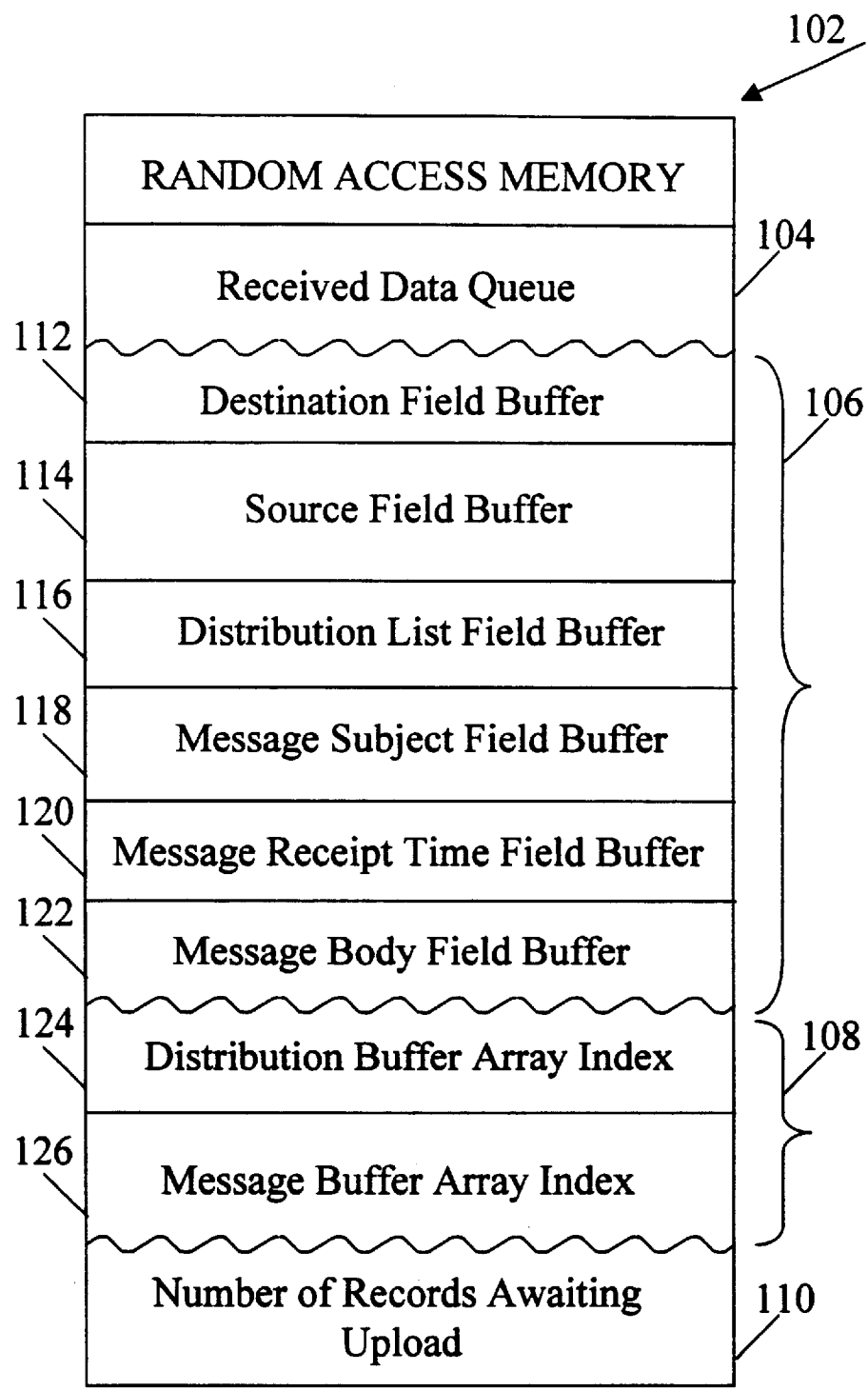
FIG. 5 is a tabular representation of the organization of volatile RAM buffers of the CPE illustrated in FIG. 1.

Referring now to FIG. 5, the structure of the RAM 14 is generally illustrated in tabular form at 102. The RAM 14 is configured by the microprocessor 12 into four main sections including a received data queue 104, a set of temporary data storage buffers 106 arranged to correspond to the data record structure 38 shown in FIG. 2, a set of indices 108 corresponding to array data structures established within temporary data storage buffers 106, and an upload buffer 110 for storing a number representing the number of CPE data records awaiting upload to the SPCS 36.

The received data queue 104 is configured to store received messages as they arrive at the CPE 10 from the SPCS 36. This is done by an application layer (not shown) according to the Open System Interconnection Standard. The received data queue 104 receives only complete and verified messages according to the ADSI protocol extension. The processor maintains separate read and write pointers (not illustrated) to indicate a specific byte location within the queue where reading or writing is to next commence.

The temporary data storage buffers 106 are sized to permit storage of a maximal length data record, that is, the data record shown in FIG. 2 with all fields completely full of data. This permits any data record that has been transmitted by the SPCS 36 to be reassembled in RAM 14 after reception at the CPE 10, without fragmenting the data associated with a given line of the record, when such data is received. Thus, memory management is simplified to merely checking that data portions of the received messages do not exceed the size of the storage buffers.

Referring to FIGS. 2 and 5, the temporary storage buffers include a destination field buffer 112 for storing data associated with the destination address line 40 of the record, a source field buffer 114 for storing data associated with the source address line 42 of the record, a distribution list field buffer 116 for storing data associated with the distribution list lines 44 of the record, a message subject field buffer 118 for storing data associated with the message subject line 46 of the record, a message receipt message receipt time buffer 120 for storing data associated with the message receipt time line 48 of the data record and message body field buffer for storing data associated with the message body line 50 and message body extension lines 19 of the record.

As described above, the data record 38 includes multiple distribution and body fields. To accommodate this in the RAM, the distribution list field buffer 116 is sized to be a multiple of 64 bytes, for example, 12,800 bytes to store two hundred 64-byte distribution list addresses. Similarly, the message body field buffer 122 is sized to be a multiple of 248 bytes, for example, 2,480 bytes to store a string 2,480 bytes long. In order to manage this data, the distribution list field buffer 116 and the message body field buffer 122 are structured as one-dimensional arrays of the indicated lengths. The indices 108 include a distribution buffer array index 124 and to include a message buffer array index 126, to address respective blocks of data corresponding to respective lines associated with the distribution list and message body respectively.

FIG. 6

Figure 6:
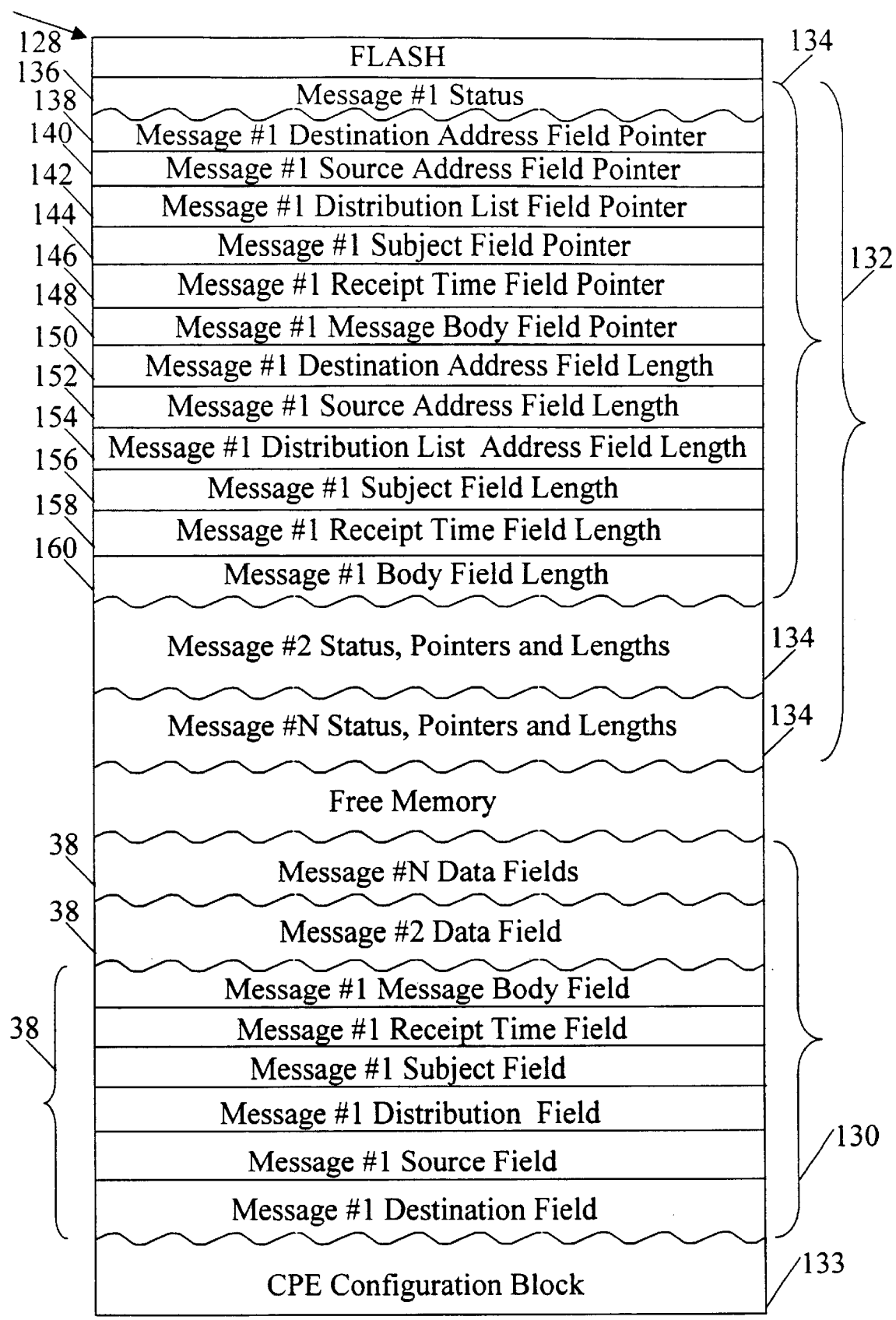
FIG. 6 is a tabular representation of the organization of non-volatile RAM buffers of the CPE illustrated in FIG. 1.

Referring now to FIG. 6, the structure of the FLASH 18 is generally illustrated at 128 in tabular form. The FLASH 18 is arranged into three main blocks including a free-form message storage block 130, a message pointer block 132 and a CPE configuration block 133.

The free-form storage block 130 is adapted to compactly hold reconstituted data records. This block is of variable length and has a length depending on the number of records and the amount of data in the records.

The message pointer block 132 is configured into one set 134 of status, pointer, and length values corresponding to each data record stored in the free-form storage block 130. Each set 134 includes a message status indicator 136, a destination address field pointer 138, a source address field pointer 140, a distribution list field pointer 142, a subject field pointer 144, a receipt time pointer 146, a message body field pointer 148, a destination address field length 150, a source address field length 152, a distribution list field length 154, a subject field length 156, a receipt time field length 158, and a body field length 160.

The message status indicator 136 holds information regarding whether the CPE user has read a record 38, whether a record was due for deletion from the CPE, and the like. In this embodiment, the message status indicator 136 indicates that a record stored in FLASH is to be uploaded to the SPCS 36.

Each pointer 138, 140, 142, 144, 146, 148 and its corresponding length value 150, 152, 154, 156, 158, 160 uniquely and compactly locate a corresponding respective field in the associated data record stored in the free-form message storage block 130.

The CPE configuration block 133 stores local configuration and user preference information including a set of source addresses identifying records that are to be rejected by the CPE 10.

FIG. 7

Figure 7:
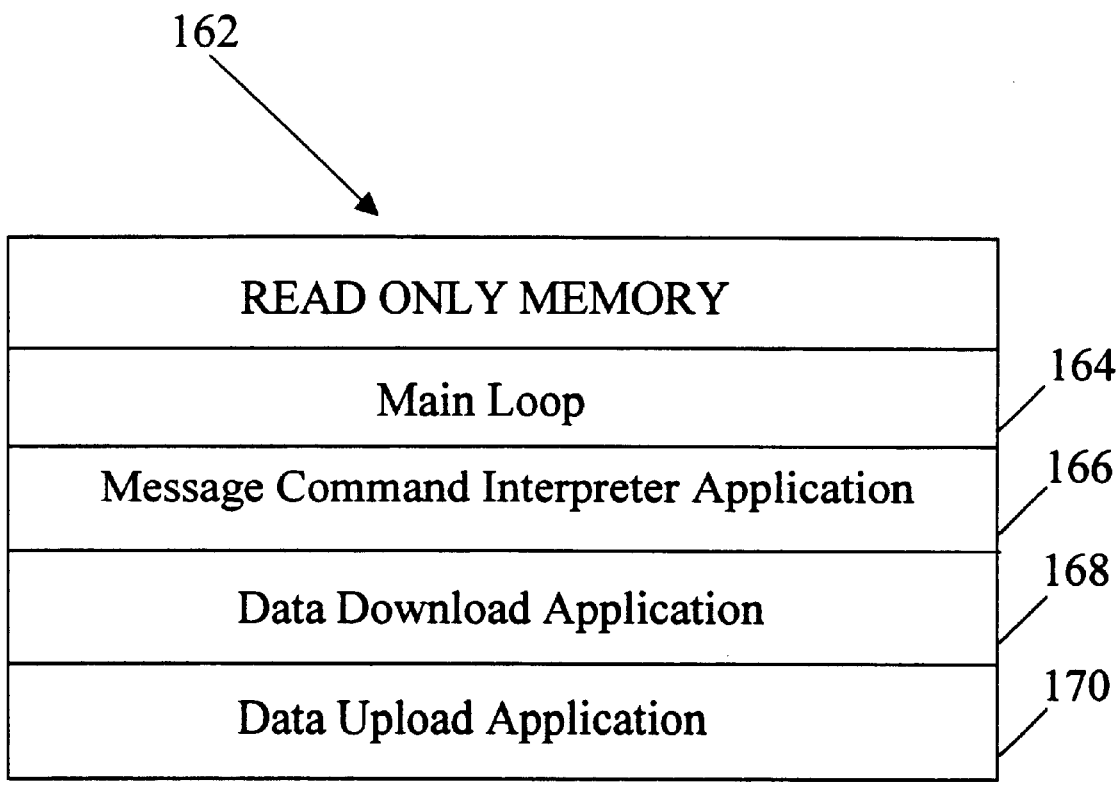
FIG. 7 is a tabular representation of programs encoded and stored in a ROM of the CPE illustrated in FIG. 1.

Referring to FIG. 7, the structure of the ROM 16 is generally illustrated at 162 in tabular form. The ROM 16 is programmed with codes for directing the microprocessor 12 to perform various functions including a Main Loop program 164, a Message Command Interpreter Application program 166, a Data Download Application program 168, and a Data Upload Application program 170.

Operation

Main loop program

FIG. 8

The operation of the CPE 10 and its interaction with the SPCS 36 will now be described.

Figure 8:
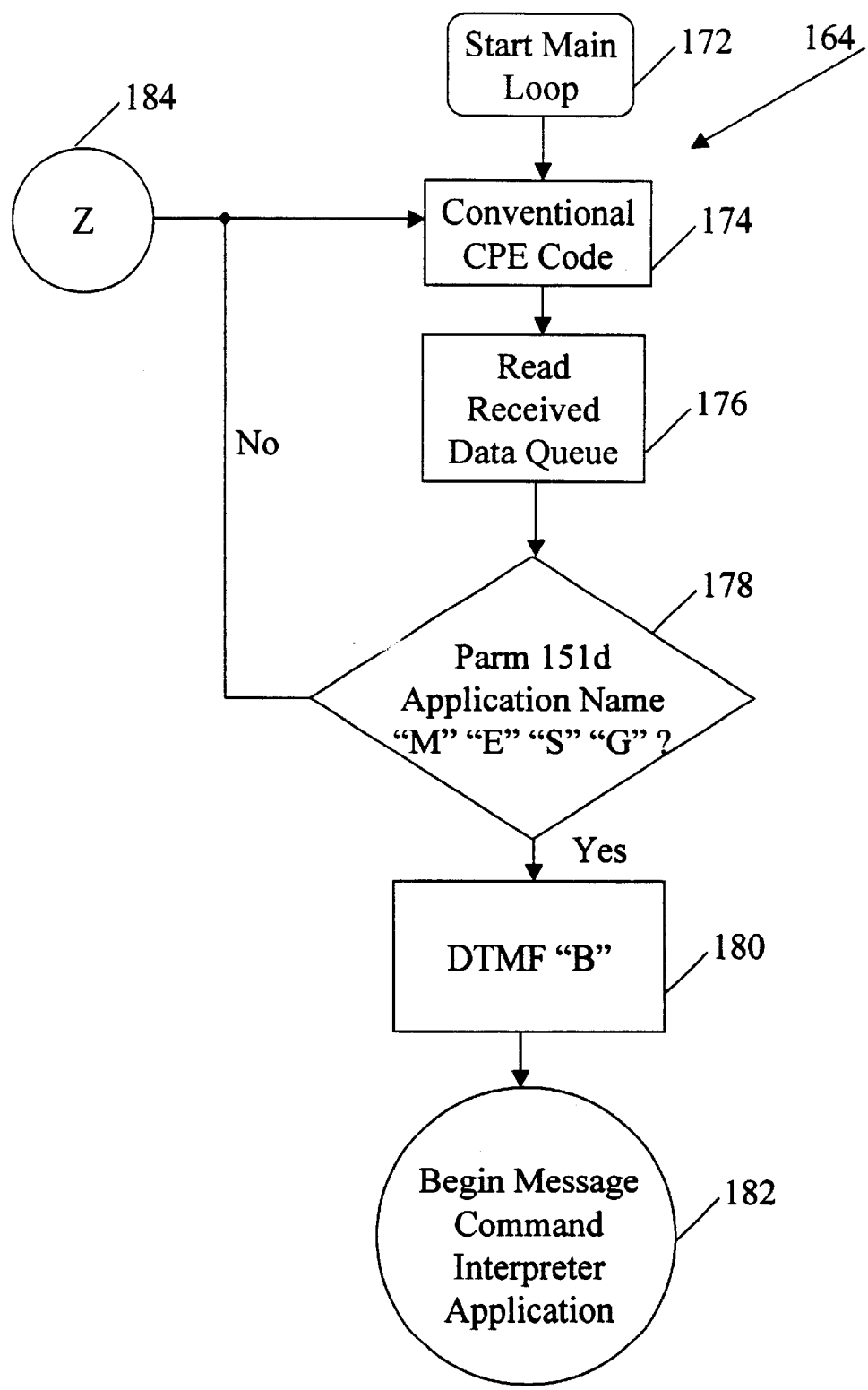
FIG. 8 is flowchart of a Main Program loop encoded and stored in the ROM illustrated in FIG. 7.
Figure 9:
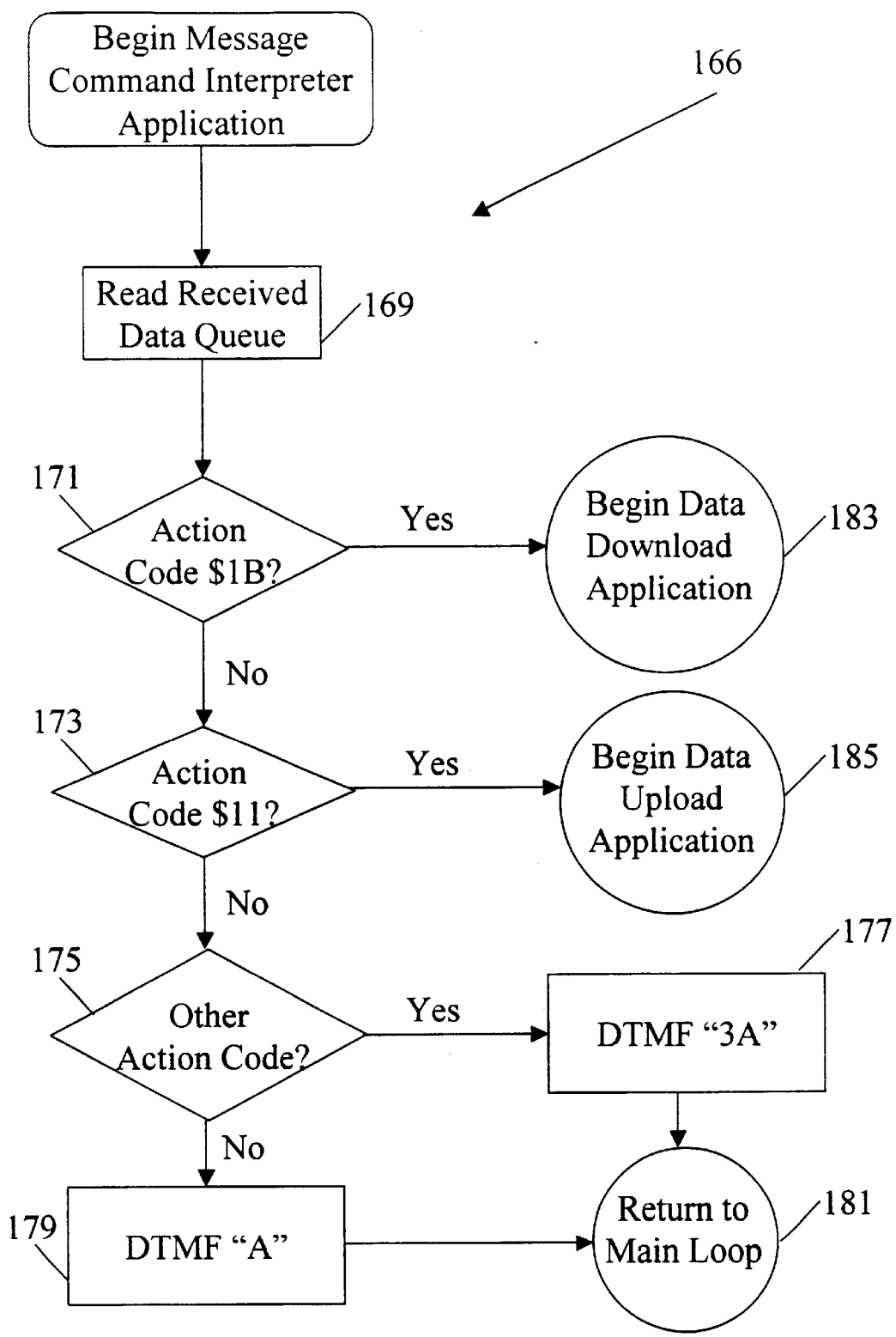
FIG. 9 is a flowchart of a Message Command Interpreter Application program encoded and stored in the ROM illustrated in FIG. 7.

Referring to FIGS. 1 and 8, the Main Loop program 164 includes block 174 which directs the microprocessor 12 to receive and react to general ADSI instructions from the SPCS 36, on how to switch between voice and data modes as defined in the ADSI standard, and to implement certain other functionality not part of the invention, for example creating, editing, and viewing messages at the CPE 10. The functionality to receive and react to general ADSI instructions is interrupt driven and fully specified in Bellcore standard TR-1273 incorporated by reference herein. Only complete and valid ADSI instructions are accepted by the CPE 10 and placed into the received data queue 104 shown in FIG. 5.

Referring back to FIG. 8, block 176 directs the microprocessor 12 to periodically read the received data queue 104. Messages stored in the received data queue have a format as shown in FIG. 3.

CPE configured query

Referring to FIGS. 3 and 8, block 178 directs the microprocessor 12 to address the received data queue to read the STA parameter field 60 to determine whether or not it contains a value equal to the 151$d$ STA code and, if so, to read the application name bytes 64–70 to determine if the message relates to an e-main or page application. If so, then the microprocessor is directed to read the action code byte 72 to determine whether or not it contains a null value. If so, the message is interpreted as a query as to whether or not the CPE is configured to run the message command interpreter application. If the CPE is configured to run the message command interpreter application, the processor is directed to Block 180 which directs the processor to cause the DTMF transmitter 24 to transmit a DTMF "B" acknowledgment signal on the public telephone network 30 to the SPCS 36, to confirm that the CPE 10 has received a message and is configured to respond to the message. Thus, the receiver is operable to receive messages in compliance with at least one predefined ADSI protocol extension.

Receipt of the acknowledgement signal signals, the SPCS to initiate transmission and subsequent messages.

Block 182 then directs the microprocessor to launch the message command interpreter application 166 for use with subsequent messages.

In the event that the STA parameter field 60 does not contain a 151d STA code, or the application name bytes do not identify an e-main or page application the processor is directed back to Block 174 where it runs conventional CPE code.

The SPCS 36 is programmed to interpret either a DTMF "A" signal or a null signal for a specified interval, to mean that a CPE is not configured to run the message command interpreter application 166. If a CPE was not configured to run a message command interpreter application, it would not have a processor operable to respond to the query and therefore, no DTMF signal would be presented back to the SPCS and the SPCS would assume the CPE is not able to accept e-mail or page messages.

Message Command Interpreter Application Program

FIG. 9

Referring now to FIGS. 1, 3, 4 and 9, the Message Command Interpreter Application is generally illustrated at 166, and begins with block 169 which instructs the microprocessor 12 to read the received data queue 104 after the next message is received.

Sufficient Memory query, upload query

Blocks 171 and 173 direct the microprocessor 12 determine whether or not the STA parameter field 60 and the action code byte 72 of the message just received specify a sufficient memory query 80 or an upload query 98. If neither of these queries is specified, then block 175 directs the microprocessor 12 to determine whether the action code field holds a value other than that which specifies a sufficient memory query and an upload query ($13 and $11). If so, then block 177 directs the microprocessor 12 to cause a DTMF "3A" signal to be transmitted to the SPCS 36 to indicate to the SPCS 36 that an incorrect action code was read. Block 181 then directs the microprocessor 12 to return to the Main Loop program 164 shown in FIG. 8. Also, if the STA parameter field 60 holds a value other than 151d, block 179 directs the microprocessor 12 to cause a DTMF "A" signal to be transmitted to indicate to the SPCS 36 that a valid STA parameter code was not received. Block 181 then directs the microprocessor 12 to return to the Main Loop program 164. Thus, different DTMF signals are transmitted back to the SPCS 36 to identify errors in the received message.

Figure 10A:
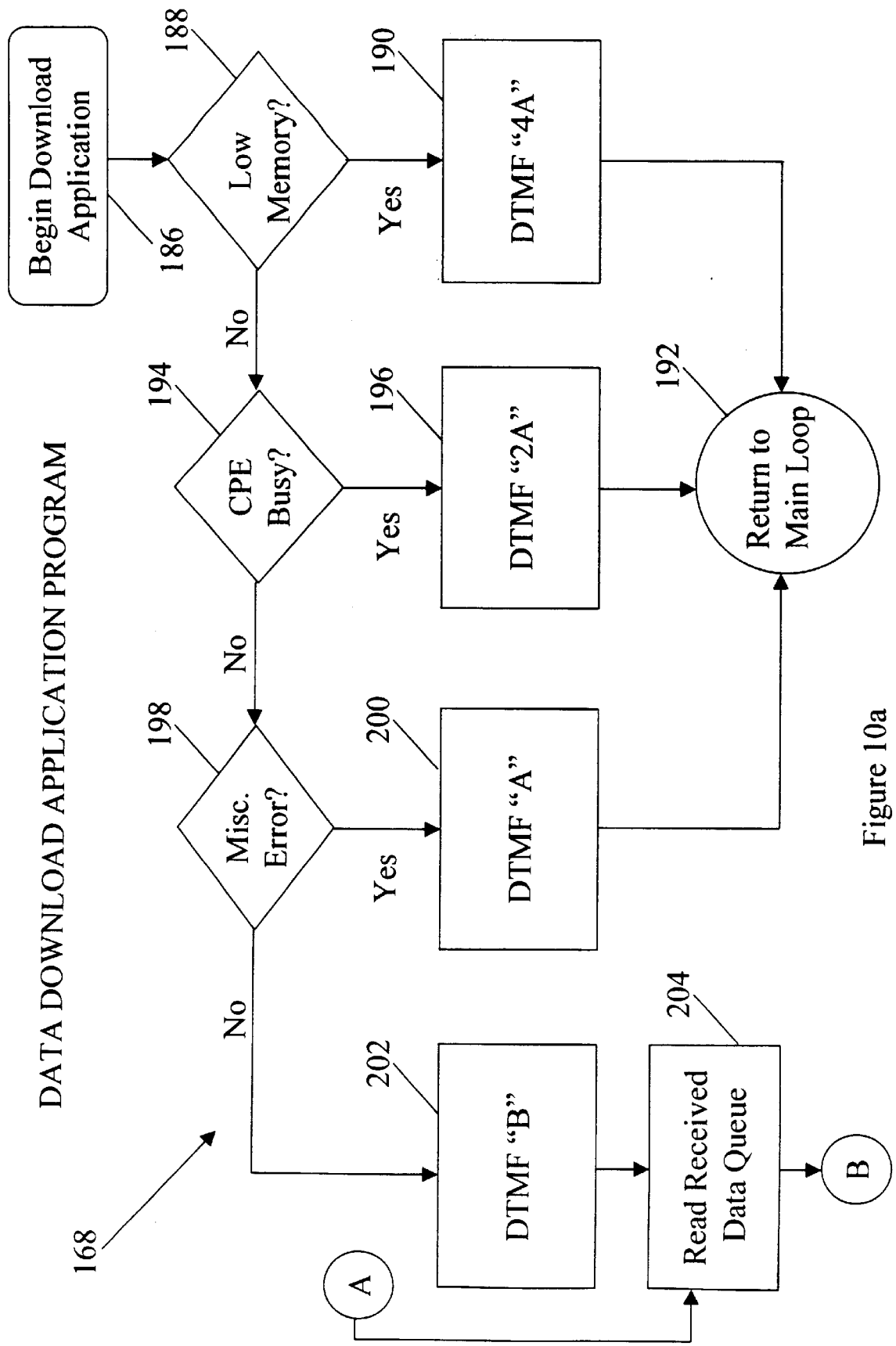
FIGS. 10a–10i form a flowchart of a Data Download Application program encoded and stored in the ROM illustrated in FIG. 7.
Figure 10B:
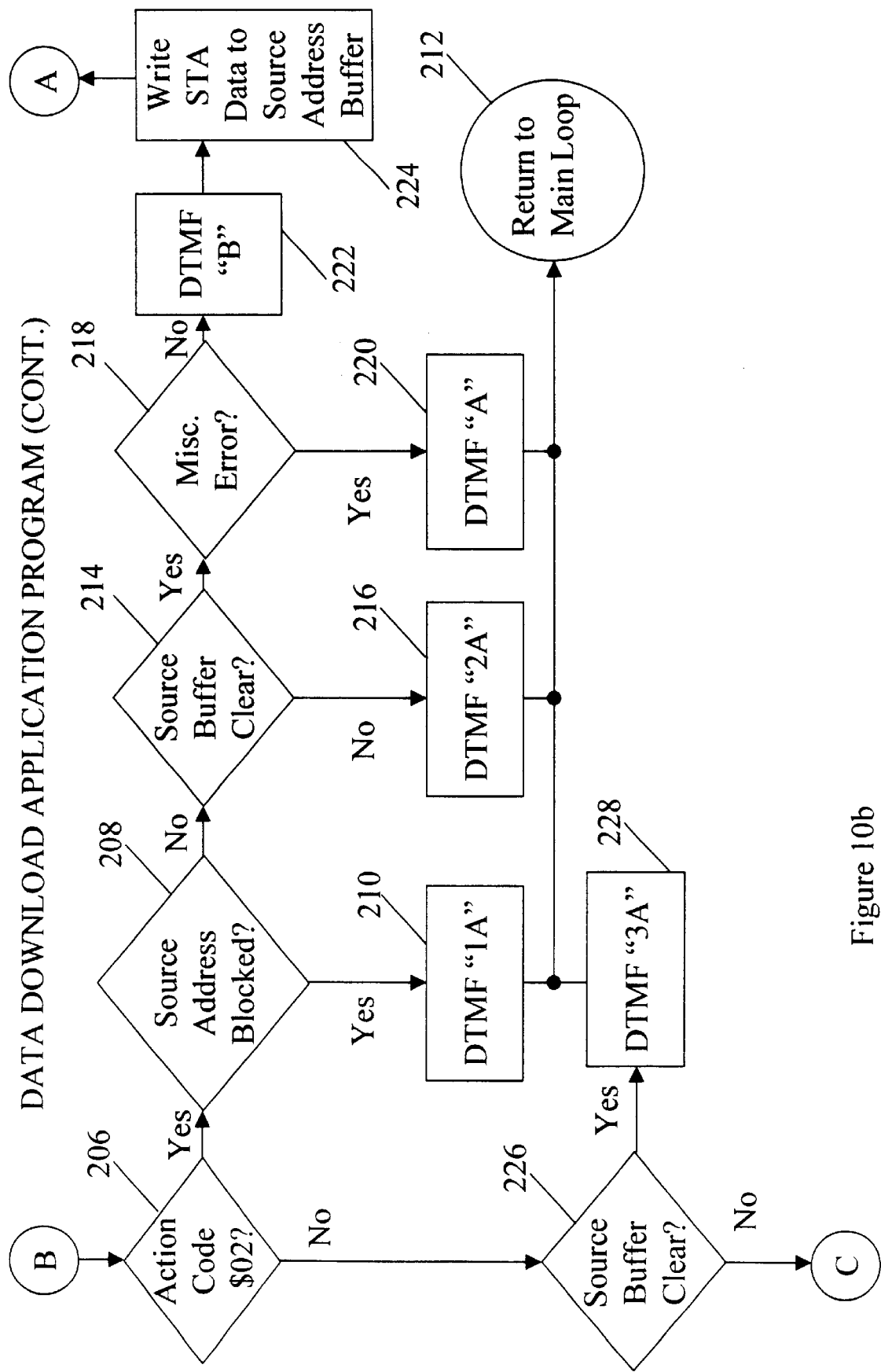

Alternatively, if at block 171 the contents of the action code byte 72 specify the sufficient memory query 80, shown in FIG. 4, then block 183 directs the microprocessor 12 to begin the Data Download Application program 168 shown in FIG. 10a. Alternatively, if at block 173 the contents of the action code byte 72 specify the upload query 98 shown in FIG. 4, then block 185 directs the microprocessor 12 to begin the Data Upload Application 170 shown in FIG. 11.

Data Download Application program

FIGS. 10a, 10b, 10c, 10d, 10e, 10f, 10g, 10h and 10i.

Referring now to FIGS. 1, 2, 3, 4, 10a, 10b, 10c, 10d, 10e, 10f, 10g, 10h, and 10i the Data Download Application is generally illustrated at 168. It should be noted that FIGS. 10a, 10b, 10c, 10d 10e, 10f, 10g, 10h, and 10i illustrate a single flowchart in four sections, the various sections interconnecting through nodes "A", "B", "C" and "D".

The data download application begins with block 188 which directs the microprocessor 12 to read the data length field 62 of the message in the received data queue 104 to determine if there is enough free space in FLASH 18 to store the message as a record. If there is not enough free space, block 190 directs the microprocessor 12 to cause a DTMF "4A" signal to be transmitted to the SPCS 36 to indicate that the message cannot be downloaded at this time. Block 192 then directs the microprocessor 12 back to the Main Loop program 164.

Alternatively, if there is enough free space in FLASH 18 to store the message, block 194 directs the microprocessor 12 to determine if the CPE 10 is currently in the process of downloading a previous message. If so, then block 196 directs the microprocessor 12 to cause a DTMF "2A" signal to be transmitted to the SPCS 36 to indicate that the message in the received data queue cannot be downloaded at this time. Block 192 then directs the microprocessor 12 back to the Main Loop program 164 shown in FIG. 8.

If the CPE 10 is not currently in the process of downloading a previous message, then block 198 directs the microprocessor 12 to determine if there are any other problems in the CPE 10 that prevent the download from commencing. If so, then block 200 directs the microprocessor 12 to cause a DTMF "A" signal to be transmitted to the SPCS 36 to indicate that the download cannot proceed. Thus, if there is insufficient memory, the CPE is busy or there is some other reason the message in the received data queue cannot be transferred to the FLASH 18, a code is sent to the SPCS to indicate a problem and the message is not transferred to the FLASH 18. Thus, the transmitter is operable to transmit a signal to the SPCS when the receive message meets a predefined criteria.

If no problems exist, block 202 directs the microprocessor 12 to cause a DTMF "B" signal to be transmitted to the SPCS 36 to indicate that the CPE 10 is ready to receive the new record. Block 204 then directs the microprocessor 12 to read the received data queue 104 after receipt of the next message.

Download Source address command

Receipt of another message is determined when the microprocessor reads another 151d code in the STA parameter field 60. Block 206 then directs the microprocessor 12 to determine whether the contents of the action code byte 72 contain the value $02 identifying a download source address command 84. If so, then block 208 directs the microprocessor 12 to parse the data fields 74 of the message to extract the source address and to determine whether it corresponds to any entries in a list of blocked source addresses stored in the CPE configuration block 133 in the FLASH 18. If the source address corresponds to any entry in the list, block 210 directs the microprocessor 12 to cause a DTMF "1A" signal to be transmitted to indicate to the SPCS 36 that the record is being refused. Block 212 then directs the microprocessor 12 back to the Main Loop program 164 shown in FIG. 8.

Alternatively, if the source address line 42 does not correspond to an entry in the list of blocked source addresses, then block 214 directs the microprocessor 12 to determine if the source field buffer 114 is clear. If not, then it is deemed that a duplicate source address has been received and block 216 directs the microprocessor 12 to cause a DTMF "2A" signal to be transmitted to the SPCS 36 to indicate that the record is being refused. Block 212 then directs the microprocessor 12 back to the Main Loop program 164 shown in FIG. 8.

If the source field buffer 114 is not clear, block 218 directs the microprocessor 12 to determine if there are now any problems in either the record or the CPE 10 that prevent the record from being accepted. If so, block 220 directs the microprocessor 12 to cause a DTMF "A" signal to be transmitted to the SPCS 36 to indicate that the record is being refused, and block 212 directs the microprocessor 12 back to the Main Loop program 164 shown in FIG. 8.

If no problems exist, block 222 directs the microprocessor to cause the DTMF transmitter 24 to transmit a DTMF "B" signal to the SPCS 36 to indicate acceptance of the source address line 42. Block 224 then directs the microprocessor 12 to write the contents of the data fields 74 of the message into the source field buffer 114 in the RAM 14. The microprocessor 12 is then directed back to block 204 to wait for the next message to be received in the received data queue 104.

If at block 206, the contents of the action code byte 72 do not specify a download source command 84, block 226 directs the microprocessor 12 to determine whether the source field buffer 114 is clear. If so, it is deemed that a corrupt message has been received and block 228 directs the microprocessor 12 to cause a DTMF "3A" to be transmitted to the SPCS 36 to indicate that the CPE 10 refuses the corrupt message and block 212 directs the microprocessor 12 back to the Main Loop program 164 shown in FIG. 8. Alternatively, if the source field buffer 114 is not clear, then it is deemed that the source address line 42 for the record has already been received and stored and the microprocessor 12 is directed to block 230 of FIG. 10b.

Figure 10C:
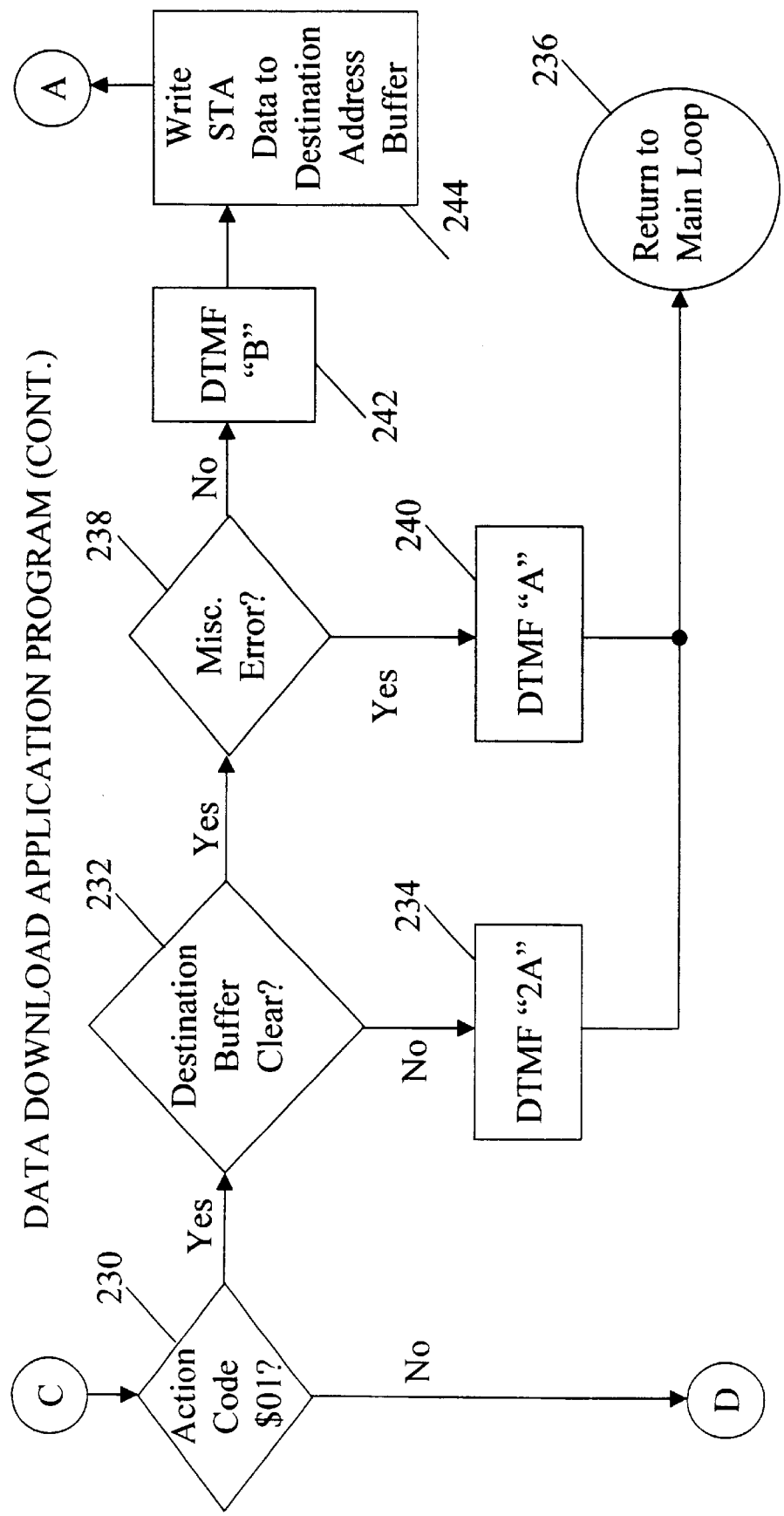
Figure 10D:
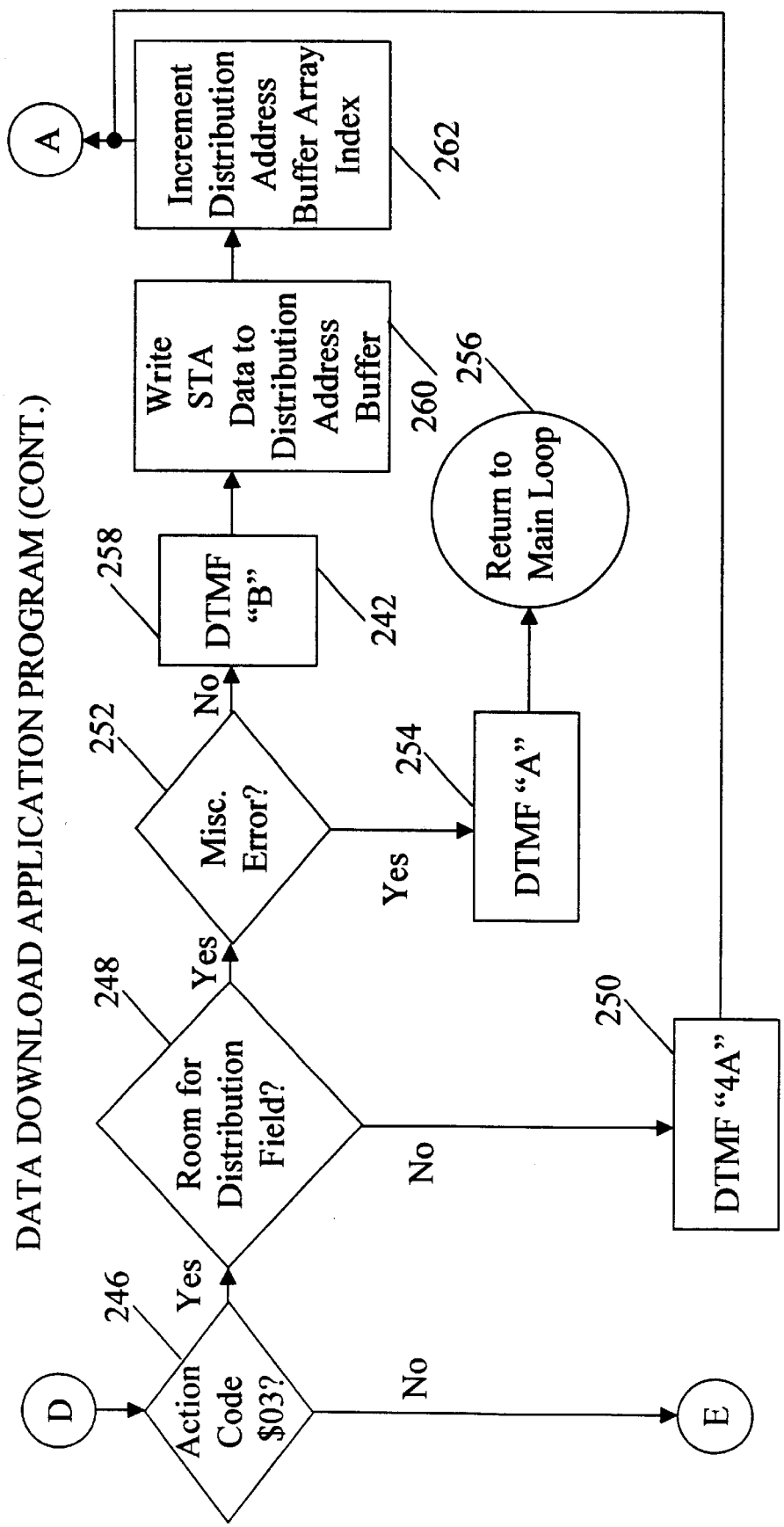
Figure 10E:
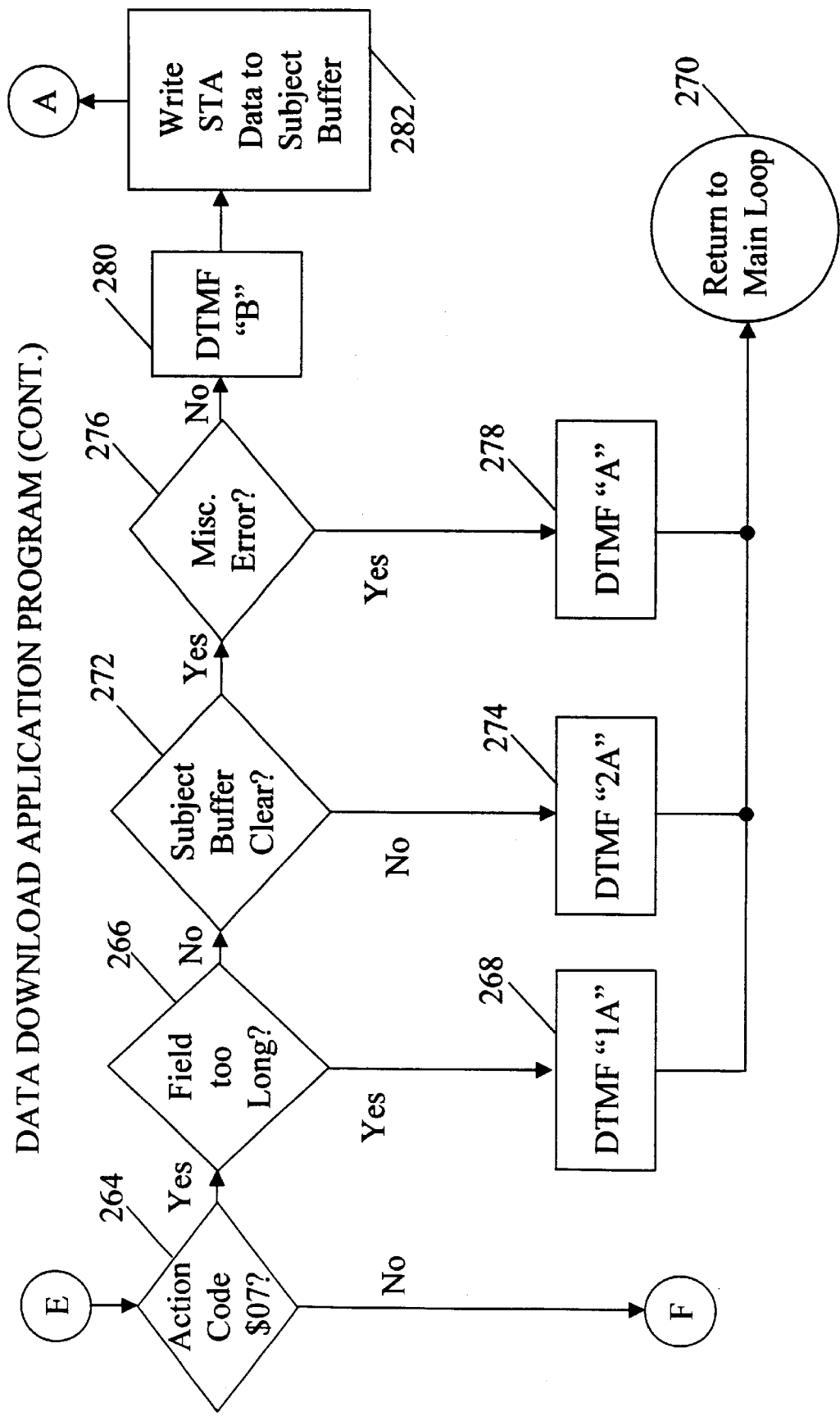
Figure 10F:
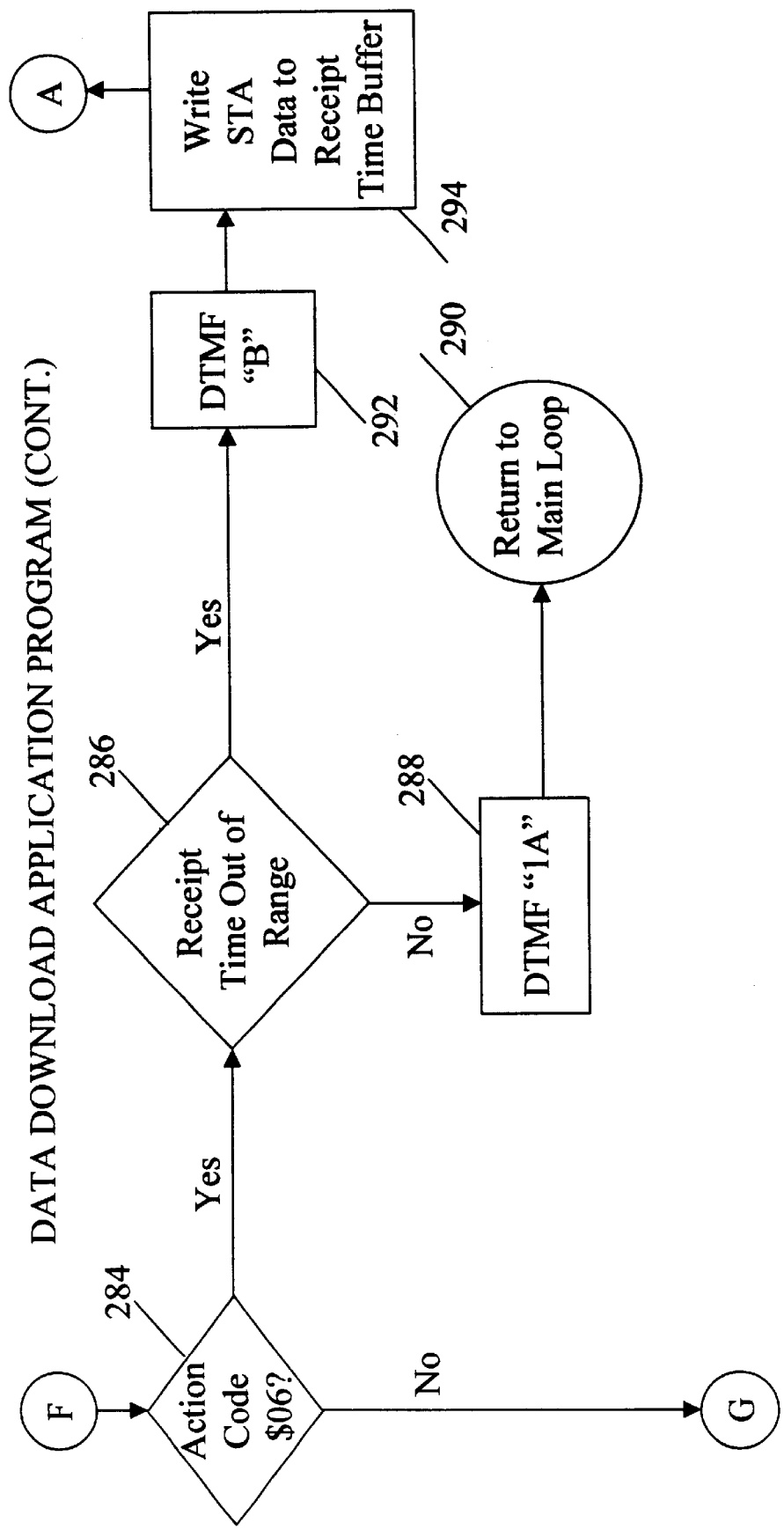
Figure 10G:
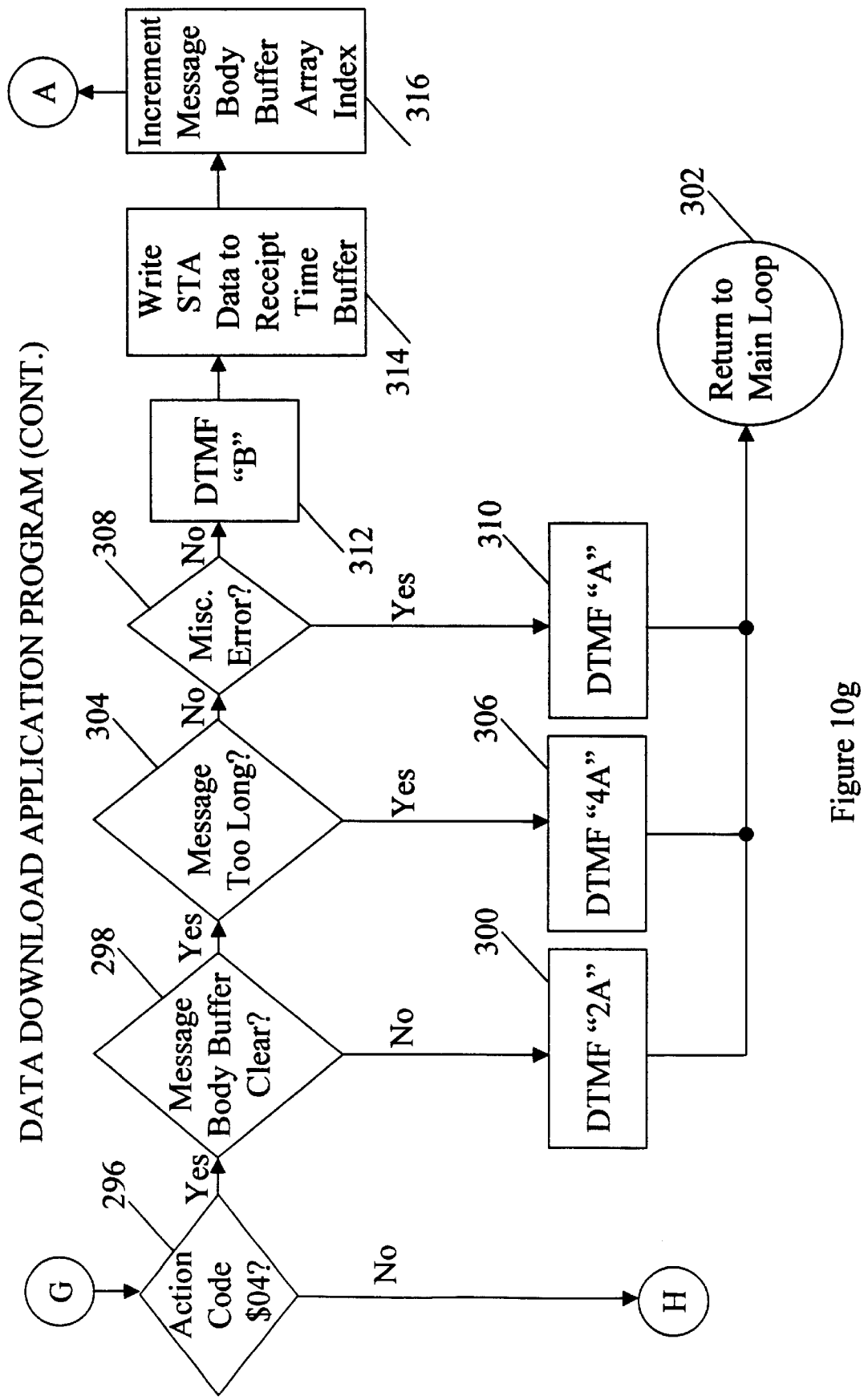
Figure 10H:
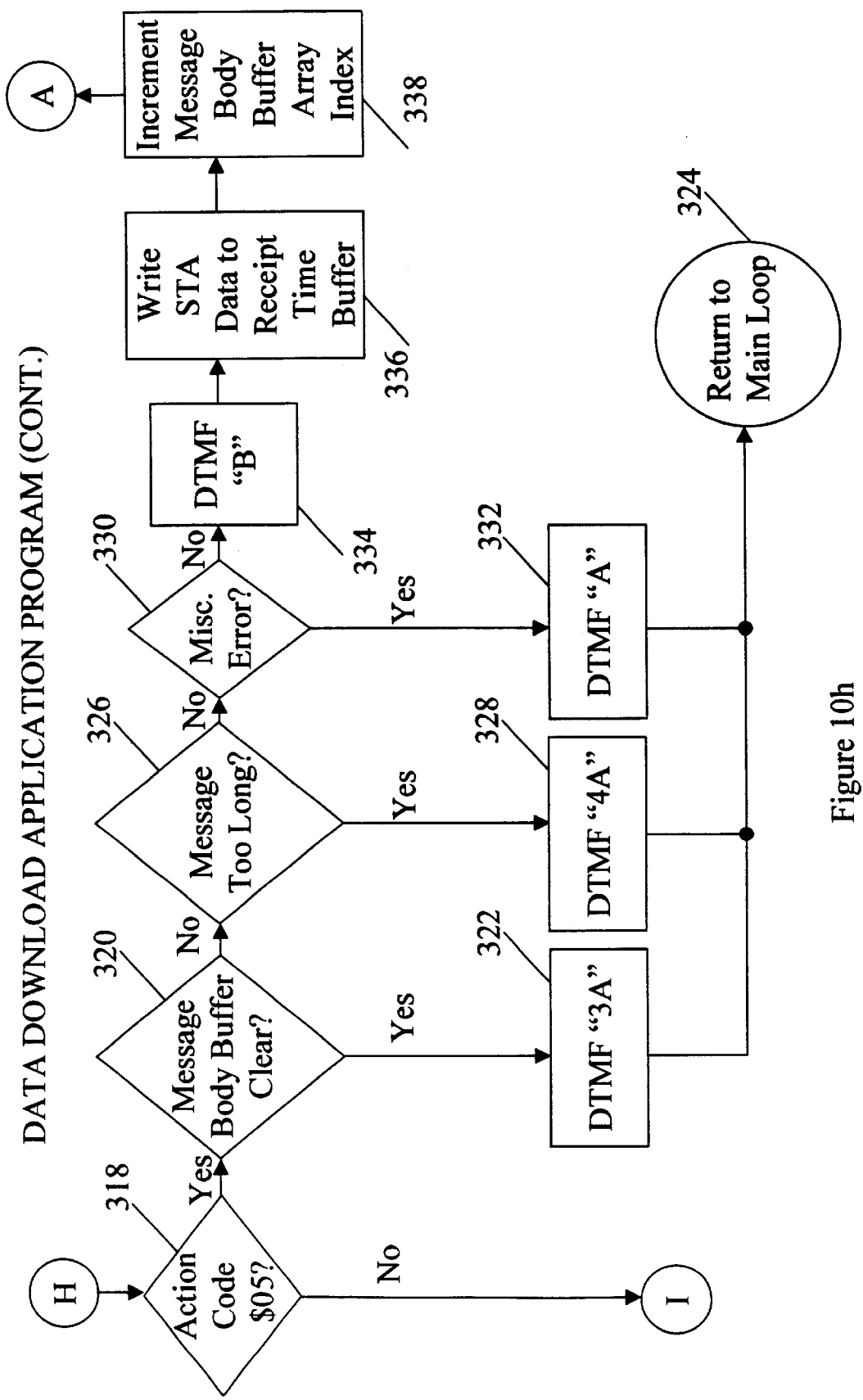

FIGS. 10c, 10d and 10e.

Download Destination Address command

Referring to FIG. 10c, 10d, and 10e, block 230 directs the microprocessor 12 to determine whether the contents of the action code byte 72 identify a download destination address command. If so, block 232 directs the microprocessor 12 to determine if the destination field buffer 112 is clear. If the destination field buffer 112 already contains destination data, ie., is not clear, then it is deemed that the incoming message is corrupt and block 234 directs the microprocessor 12 to cause the DTMF transmitter 24 to transmit a "2A" signal to the SPCS 36 to indicate that the corrupt record is being refused and block 236 directs the microprocessor 12 to return to the Main Loop program 164 shown in FIG. 8.

Alternatively, if the destination field buffer 112 is clear, then block 238 directs the microprocessor 12 to determine if there exist any other problems in either the message or the CPE 10 that prevent the record from being accepted. If so, then block 240 directs the microprocessor 12 to cause a DTMF "A" signal to be transmitted to the SPCS 36 to indicate that the record is being refused, and block 236 directs the microprocessor 12 back to the Main Loop program 164 shown in FIG. 8.

If there are no other problems, block 242 directs the microprocessor to cause the DTMF transmitter 24 to transmit a DTMF "B" signal to the SPCS 36 to indicate acceptance of the destination address field information. Block 244 then directs the microprocessor 12 to write the contents of the byte field into the destination field buffer 112 in the RAM 14. The microprocessor 12 is then directed back to block 204 of FIGS. 10a and 10b to wait for the next message to be received.

Download Distribution List command

Referring back to FIG. 10b at block 230, if the microprocessor 12 determines that the $01 code was not received, block 246 directs the microprocessor 12 to determine whether to contents of the action code byte 72 contains the value $03 identifying a download distribution address command 86. If so, block 248 directs the microprocessor 12 to read the data length field 62 of the message to determine whether the contents of the data fields 74 will fit within the remaining free space in the distribution list field buffer 116. If insufficient memory space exists, then block 250 directs the microprocessor 12 to cause a DTMF "4A" signal to be transmitted to inform the SPCS 36 that the distribution message has been rejected. The microprocessor 12 is then directed back to block 204 in FIG. 10a to consider the next message in the received data queue 104.

If at block 248 sufficient RAM space in the distribution list field buffer 116 is found to exist, then block 252 directs the microprocessor 12 to determine if there exist any problems in either the record or the CPE 10 that prevent the record from being accepted. If such problems exist then block 254 directed the microprocessor 12 to cause a DTMF "A" signal to be transmitted to the SPCS 36 to indicate that the record is being refused, whereupon block 256 directs the microprocessor 12 back to the Main Loop program 164 shown in FIG. 8.

If there are no problems, then block 258 directs the microprocessor to cause the DTMF transmitter 24 to transmit a DTMF "B" signal to the SPCS 36 to indicate acceptance of the distribution field message. Block 260 then directs the microprocessor 12 to parse the data fields 74 of the message to extract the distribution list line 44 and to store that data in the distribution list field buffer 116. Block 262 then directs the microprocessor 12 to increment the distribution buffer array index 124 to account for the data just stored. The microprocessor 12 is then directed back to block 204 to consider the next message in the received data queue 104.

Download Message Subject command

If at block 246, the microprocessor detects that the contents of the action code byte 72 do not specify a download distribution list command, block 264 directs the microprocessor 12 to determine whether the action code byte 72 contains the value $07 indicating a download message subject command 94.

If so, then block 266 directs the microprocessor 12 to read the contents of the data length field 52 to determine whether the content of the data fields 74 can be stored in the message subject field buffer 118 in RAM 14. If not, then block 268 directs the microprocessor 12 to cause a DTMF "1A" signal to be transmitted to the SPCS 36 to indicate that the subject line 46 is over-length and that the record is deemed corrupt. Block 270 then directs the microprocessor 12 back to the Main Loop program 164 shown in FIG. 8.

If the contents of the data fields 74 will fit in the message subject field buffer 118 block 272 directs the microprocessor 12 to determine if the message subject field buffer 118 is clear. If it is not, then block 274 directs the microprocessor 12 to cause a DTMF "2A" signal to be transmitted to the SPCS 36 to indicate that a subject data has already been stored in the message subject field buffer 118 and that the record is therefore corrupt. Block 270 then directs the microprocessor 12 back to the Main Loop program 164 shown in FIG. 8.

If the message subject field buffer 118 is clear then block 276 directs the microprocessor 12 to determine if there are any problems in either the record or the CPE 10 that prevent the record from being accepted. If there are such problems, block 278 directs the microprocessor 12 to cause a DTMF "A" signal to be transmitted to the SPCS 36 to indicate that the record is being refused, whereupon block 270 directs the microprocessor 12 back to the Main Loop program 164 shown in FIG. 8.

If no problems exist, then block 280 directs the microprocessor to cause the DTMF transmitter 24 to transmit a DTMF "B" signal to the SPCS 36 to indicate acceptance of the subject message. Block 282 then directs the microprocessor 12 to store the contents of the data fields 74 into the message subject field buffer 118 in the RAM 14, after which the microprocessor 12 is directed back to block 204 shown in FIG. 10a to consider the next message received in the received data queue 104.

Download Message Receipt Time command

Referring back to FIG. 10e, if at block 264, the microprocessor determines that the $07 action code has not been received, block 284 shown in FIG. 10c directs the microprocessor 12 to determine whether the action code field contains the value $06 identifying a download message receipt time command 92.

If the download message receipt time command is received, block 286 directs the microprocessor 12 to read the data fields 74 of the message to extract the time data and to determine if the time data conforms to proper date and time ranges. If not, then block 288 directs the microprocessor 12 to cause a DTMF "1A" signal to be transmitted to the SPCS 36 to indicate that a corrupt time information fragment field 48 has been received, whereupon block 290 directs the microprocessor 12 back to the Main Loop program 164 shown in FIG. 8

If the time information fragment field does conform to proper ranges, then block 292 directs the microprocessor 12 to cause a DTMF "B" signal to be transmitted to the SPCS 36 to indicate acceptance of the time field information and block 294 directs the microprocessor 12 to write the contents of the data fields 74 into the message receipt time buffer 120. The microprocessor 12 is then directed back to block 204 of FIG. 10a to consider the next message stored in the received data queue 104.

Download Message Body command

Referring back to FIG. 10f is at block 284, the microprocessor determines that the $06 action code was not received, block 296 directs the microprocessor 12 to determine whether the contents of the action code field identify a download message body command.

If so, block 298 directs the microprocessor 12 to determine if the message body field buffer 122 is clear. If the message body field buffer 122 already contains data, then it is deemed that either the record or the RAM 14 is corrupt whereupon block 300 directs the microprocessor 12 to cause the DTMF transmitter 24 to transmit a DTMF "2A" signal to the SPCS 36 to indicate the error and block 302 directs the microprocessor 12 to return to the Main Loop program 164 shown in FIG. 8.

If the message body field buffer 122 is clear, then block 304 directs the microprocessor 12 to read the contents of the data length field 62 to determine whether the byte portion will fit within the message body field buffer. If it will not, then block 306 directs the microprocessor 12 to cause a DTMF "4A" signal to be transmitted to the SPCS 36 to indicate that the message is unacceptable. Block 302 then directs the microprocessor 12 back to the Main Loop program 164 shown in FIG. 8.

If the byte portion will fit within the message body field buffer block 308 directs the microprocessor 12 to determine if there are any problems in either the record or the CPE 10 that prevent the record from being accepted. If so, then block 310 directs the microprocessor 12 to cause a DTMF "A" signal to be transmitted to the SPCS 36 to indicate that the record is refused. Block 302 then directs the microprocessor 12 back to the Main Loop program 164 shown in FIG. 8.

If no problems exist, block 312 directs the microprocessor to cause the DTMF transmitter 24 to transmit a DTMF "B" signal to the SPCS 36 to indicate acceptance of the data stored in the data fields 74. Block 314 then directs the microprocessor 12 to store the contents of the data fields 74 in the message body field buffer 122. Block 316 then directs the microprocessor 12 to appropriately increment the message buffer array index 126 to account for this addition to the message body field buffer 122. The microprocessor 12 is then directed back to block 204 to consider the next message received in the received data queue 104.

Message Extension command

If at block 296 the microprocessor 12 detects that the action code relating to the download message body command has not been received, block 318 directs the microprocessor 12 to determine whether the action code of the received message identifies a download message body extension command.

If the action code identifies a download message body extension command, block 320 directs the microprocessor 12 to determine if the message body field buffer 122 is clear.

If so, then block 322 directs the microprocessor 12 to cause a DTMF "3A" signal to be transmitted to the SPCS 36 to indicate that there is no corresponding body data in the message body field buffer 122 to which the body extension information fragment can be appended. Block 324 then directs the microprocessor 12 to return to the Main Loop program 164 shown in FIG. 8.

If the message body field buffer 122 is not clear, block 326 directs the microprocessor 12 to read the data length field 62 from the message to determine whether the data in the data fields 74 will fit in the message body field buffer 122. If so, then block 328 directs the microprocessor 12 to cause a DTMF "4A" signal to be transmitted to the SPCS 36 to indicate that the body extension data will not fit in the message body field buffer 122. Block 324 then directs the microprocessor 12 to return to the Main Loop program 164 shown in FIG. 8.

If the data in the data fields 74 will fit in the message body field buffer, block 330 directs the microprocessor 12 to determine if there are any problems in either the record or the CPE 10 that prevent the record from being accepted. If so, then block 332 directs the microprocessor 12 to cause a DTMF "A" signal to be transmitted to the SPCS 36 to indicate that the record is being refused. Block 324 then directs the microprocessor 12 back to the Main Loop program 164 shown in FIG. 8.

If no problems exist then block 334 directs the microprocessor to cause the DTMF transmitter 24 to transmit a DTMF "B" signal to the SPCS 36 to indicate acceptance of the message. Block 336 then directs the microprocessor 12 to store the contents of the data fields 74 in the message body field buffer 122. Block 338 then directs the microprocessor 12 to appropriately increment the message buffer array index 126 to account for this addition to the message body field buffer 122. The microprocessor 12 is then directed back to block 204 of FIG. 10a to consider the next message received in the received data queue 104.

Download Complete Notification

Figure 10I:
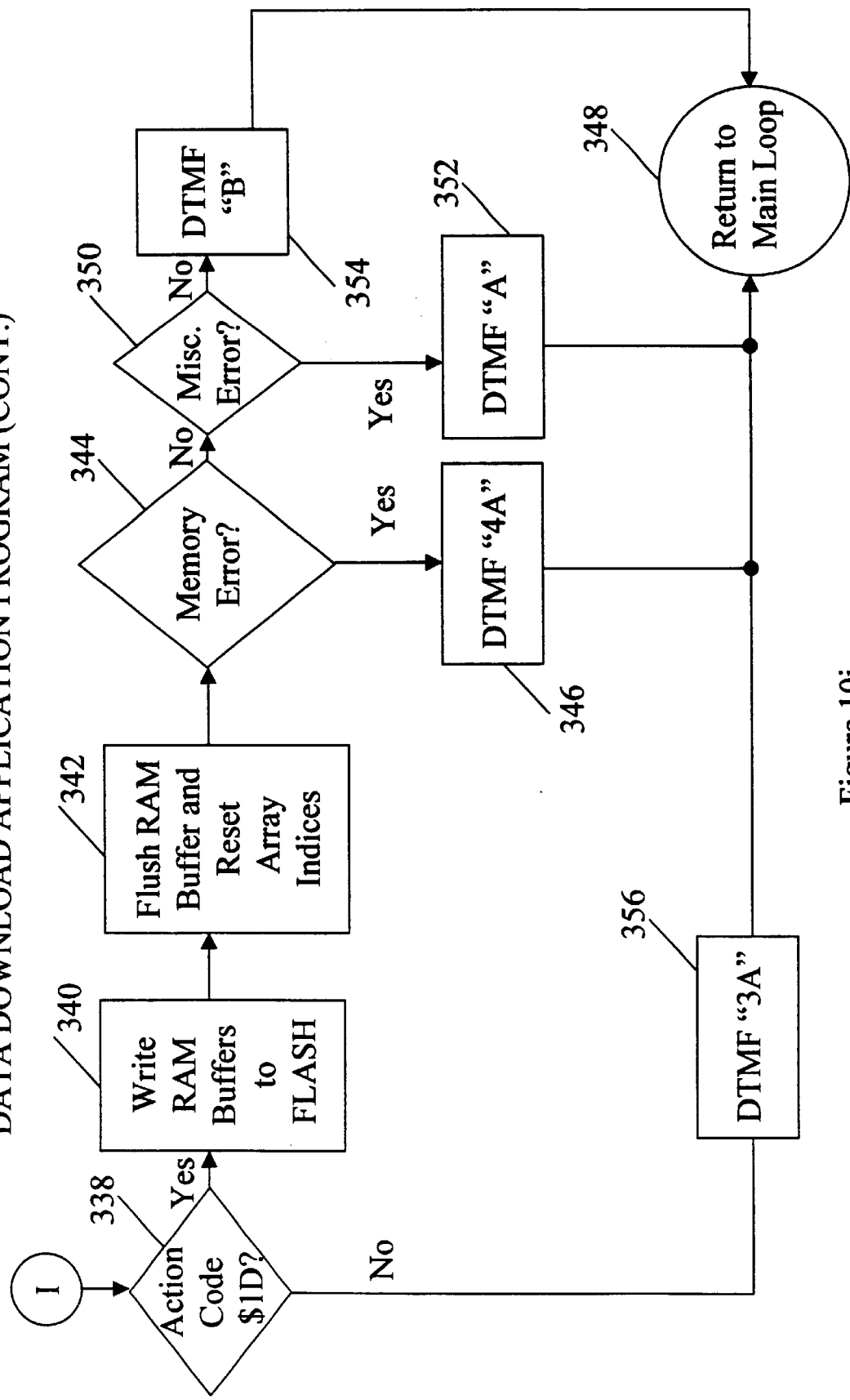

If at block 318, the microprocessor 12 determines that the action code identifying the download message body extension was not received, block 338 shown in FIG. 10i directs the microprocessor 12 to determine whether or not the action code identifying a download complete notification 96 has been received.

If a download complete notification has been received, block 340 directs the microprocessor 12 to cause the contents of the temporary data storage buffers 106 now stored in RAM 14 to be copied into free memory in the free-form message storage block 130 of the FLASH 18 and to be properly linked within the FLASH 18 by a new set of status, pointer, and length records 134. Block 342 then directs the microprocessor 12 to clear the temporary data storage buffers 106 in RAM 14 and to reset the distribution buffer array index 125 and the message buffer array index 126. The SPCS data record is thus reconstructed and stored in memory at the CPE.

Block 344 then directs the microprocessor 12 to determine whether the memory writing operation was completed properly. If not, then block 346 directs the microprocessor 12 to cause a DTMF "4F" signal to be transmitted to the SPCS 36 to indicate that the data record 38 has become corrupted, and block 348 directs the microprocessor 12 back to the Main Loop program 164 shown in FIG. 8.

If the memory writing operation 340 was completed properly 344, then block 350 directs the microprocessor 12 to determine if there exits any problems in either the record or the CPE 10. If so, then block 352 directs the microprocessor 12 to cause a DTMF "A" signal to be transmitted to the SPCS 36 to indicate that the record download operation did not conclude properly, whereupon block 348 directs the microprocessor 12 back to the Main Loop program 164 shown in FIG. 8.

If no problems exist 350, then block 354 directs the microprocessor to cause the DTMF transmitter 24 to transmit a DTMF "B" signal to the SPCS 36 to indicate acceptance of the whole record 38, whereupon block 348 directs the microprocessor 12 back to the Main Loop program 164 shown in FIG. 8. Thus, the transmitter at the CPE is operable to transmit an acknowledgement signal from the CPE to the SPCS in response to successful receipt of the whole record.

If at block 338, the action code identifying the download complete notification has not detected, block 356 directs the microprocessor 12 to cause the DTMF transmitter 24 to transmits a "3A" signal to the SPCS 36 to indicate that the action code received did not match any predetermined value. Block 348 then directs the microprocessor 12 back to the Main Loop program 164 shown in FIG. 8.

Thus, effectively, each time a message is received, the action code associated with the message is tested to determine what type of command, query, or notification it relates to and an acknowledgement signal is transmitted to the SPCS 36. Generally, if an unrecognized command is received appropriate indication is transmitted back to the SPCS 36. After reconstructing the data record at the CPE, the messaging platform at the CPE is enabled to read the record and make its contents available to a user through an editor or other viewing mechanism.

FIG. 11

Data Upload Application Program

Figure 11A:
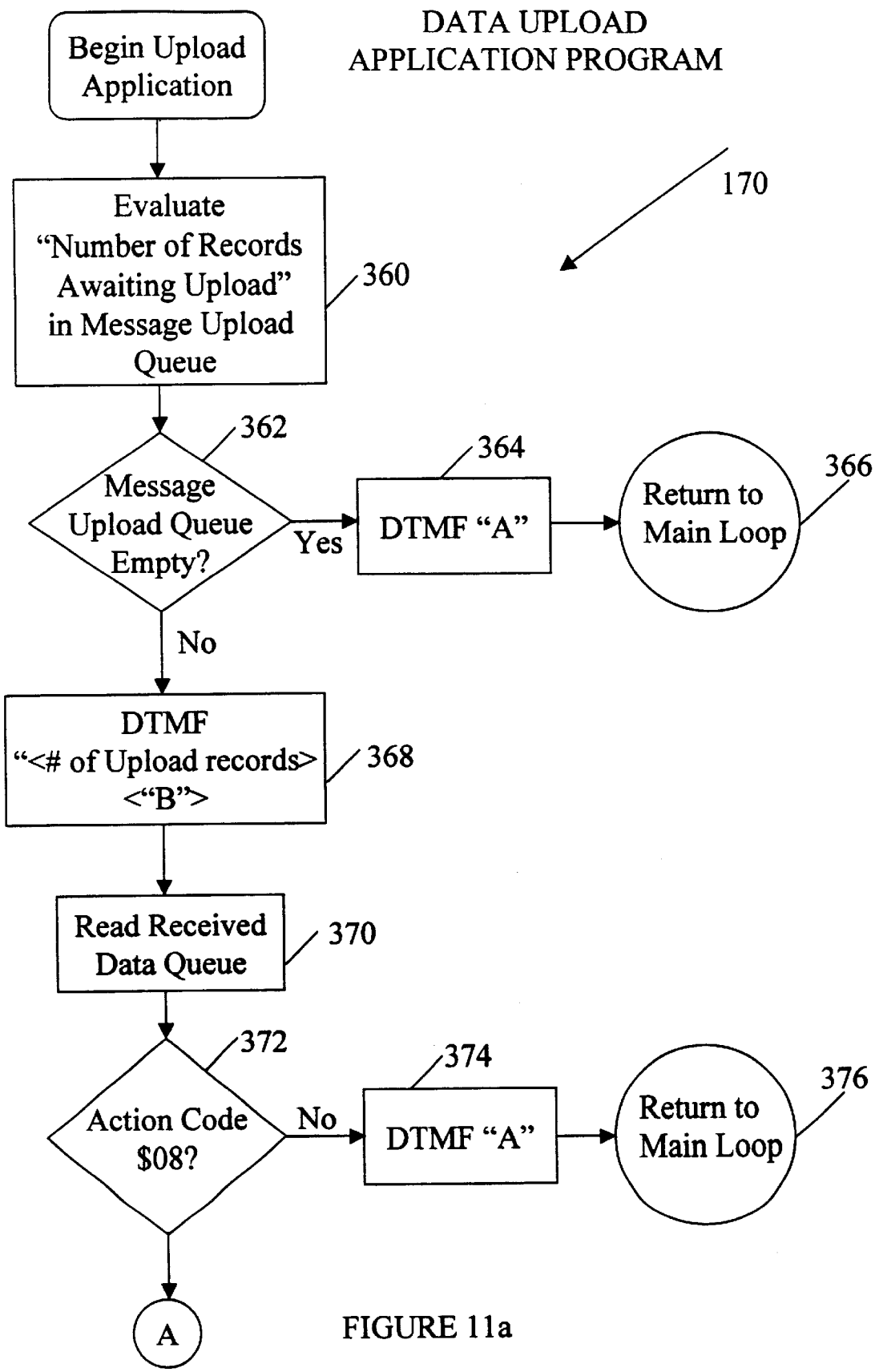
FIGS. 11a and 11b are a flowchart of a Data Upload Application program encoded and stored in the ROM illustrated in FIG. 7.
Figure 11B:
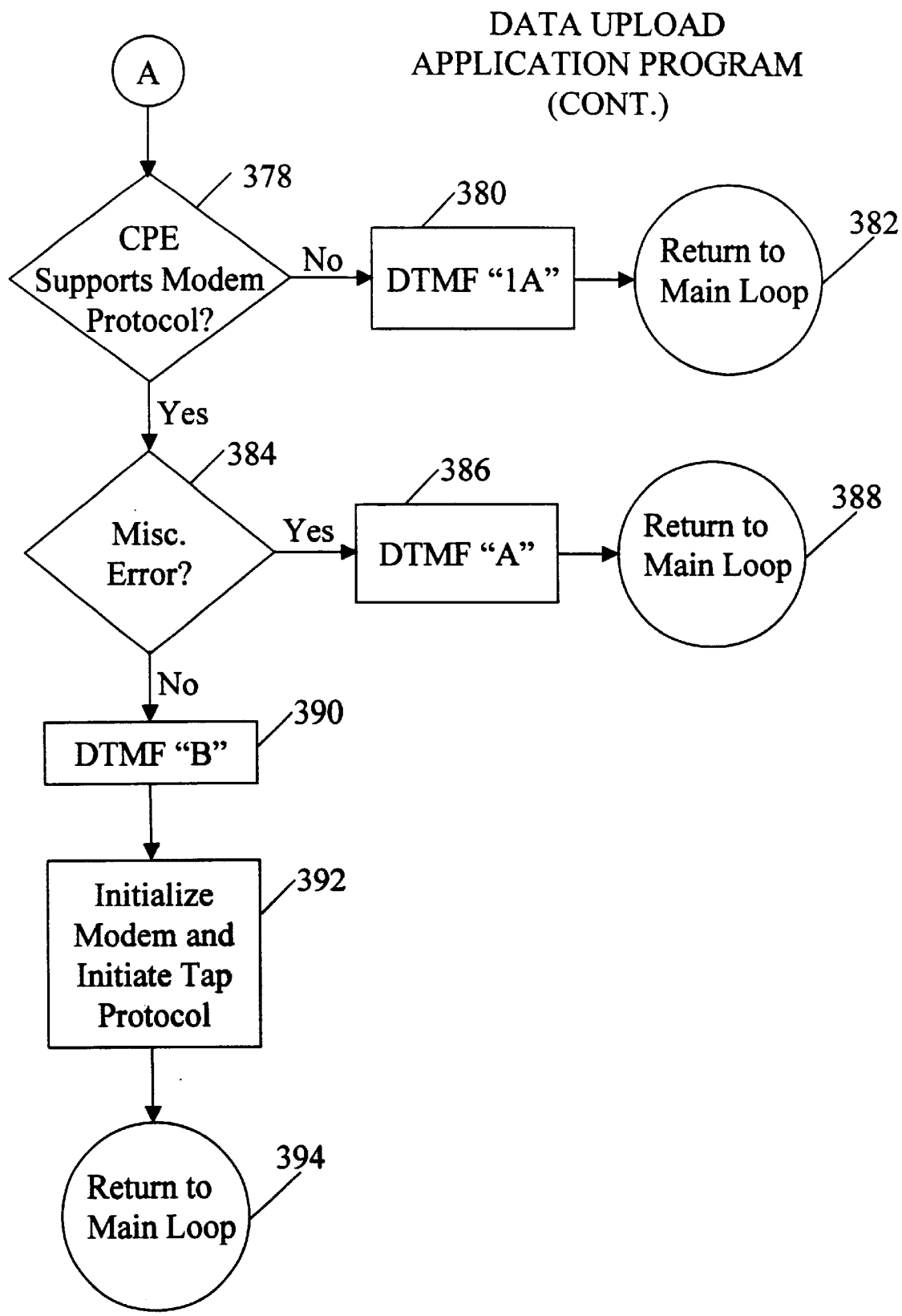

Referring to FIGS. 11a and 11b, the Data Upload Application program is generally illustrated at 170. The program begins with block 360 which directs the microprocessor 12 to reset the upload buffer 110, to examine the message status indicator 136 of each data record stored in the FLASH 18 to determine which records are identified to be uploaded to the SPCS 36, and to increment the Number of Upload buffer 110 for each record flagged for upload.

Block 362 then directs the microprocessor 12 to determine if the value stored in the upload buffer 110 is greater than zero. If the upload buffer 110 value is not greater than zero, (ie. empty) block 364 directs the microprocessor 12 to cause the DTMF transmitter 24 to transmit a DTMF "A" signal to the SPCS 36 to confirm that there are no message records to be uploaded to the SPCS 36 and block 366 directs the microprocessor 12 to return to the Main Loop program 164 shown in FIG. 8.

Alternatively, if the upload buffer 110 value is greater than zero, then block 368 directs the microprocessor 12 to cause the DTMF transmitter 24 to transmit a DTMF "B" signal to the SPCS 36 preceded by a DTMF signal representing each base ten digit of the value of the Upload buffer 110. For example, if there were 3 messages flagged for uploading, then block 368 would direct the microprocessor to cause the DTMF signal "3" "B" to be transmitted. As another example, if there were 32 messages flagged for uploading, then block 368 would direct the microprocessor to cause the DTMF signal "3" "2" "B" to be transmitted.

Engage Modem Command

Block 370 then directs the microprocessor 12 to read the received data queue 104. Block 372 then directs the microprocessor 12 to determine whether the action code field contains the value $08, indicating an engage modem command 100. If this value is not received block 374 directs the microprocessor 12 to cause the DTMF transmitter 24 to transmit an "A" signal to the SPCS 36 to indicate that an error has occurred and block 376 directs the microprocessor 12 to return to the Main Loop program 164, shown in FIG. 8.

If the action code byte 72 contains the value $08 block 378 directs the microprocessor 12 to determine if the CPE 10 supports the modem protocol specified in the data fields 74 of the message. If not, then block 380 directs the microprocessor 12 to cause a DTMF "1A" signal to be transmitted to the SPCS 36 and block 382 directs the microprocessor 12 back to the Main Loop program 164 shown in FIG. 8.

Alternatively, if the CPE 100 supports the modem protocol 378, block 384 directs the microprocessor 12 to determine if there are any problems in either the record to be uploaded or the CPE 10 that prevent a successful upload from taking place. If so, then block 386 directs the microprocessor 12 to cause a DTMF "A" signal to be transmitted to the SPCS 36 to indicate that the upload is being aborted, whereupon block 388 directs the microprocessor 12 back to the Main Loop program 164 shown in FIG. 8.

Alternatively, if no problems exist, then block 390 directs the microprocessor to cause the DTMF transmitter 24 to transmit a DTMF "B" signal to the SPCS 36 to acknowledge that the CPE 10 will be entering a TAP host mode and block 392 directs the microprocessor to engage the modem 26 in a TAP session, using the protocol specified in the data fields 74 of the message. Thus, the modem may transmit messages to the SPCS in a communications protocol other than the protocol in which the receive message was received.

Once the modem 26 is in TAP mode, the SPCS 36 will direct the microprocessor 12 and the CPE 10 pursuant to the TAP protocol and will upload all records identified for upload by their status indicators 136. After the TAP session has completed, block 394 directs the microprocessor 12 to return to the Main Loop program 164 shown in FIG. 8.

At the SPCS the CPE data records are received and reconstructed and made available, by the messaging platform, to another CPE identified as the intended recipient.

Thus, the microprocessor is programmed to store structured message data and to exchange such data with a SPCS. For memory management simplicity, the microprocessor is programmed to temporarily store the data in RAM without regard to memory efficiency but only with regard to fixed memory boundaries and maximum field lengths. For storage efficiency, the microprocessor is programmed to more permanently store the data in FLASH with pointers to facilitate compact storage. The microprocessor is programmed to communicate with the SPCS using standard, open protocols (ADSI and TAP) and to transmit a wide assortment of error messages to facilitate the tracing of problems in the communication link between the CPE and the SPCS.

While a specific embodiment of the invention has been described and illustrated, such embodiment should be considered illustrative of the invention only and not as limiting the invention as construed in accordance with the accompanying claims.

What is claimed is:

1. A method of communicating information comprising:
   a) storing said information as information fragments in a data record, each fragment having an associated identifier; and
   b) transmitting a plurality of messages to a receiver, each message having an information fragments and its associated identifier from said data record;
   c) wherein at least one of said messages if transmitted in compliance with at least one ADSI protocol extension.

2. A method as claimed in claim 1 further comprising transmitting a query message to query whether or not a receiving device is ready to receive said messages.

3. A method as claimed in claim 2 further comprising transmitted a query message to query whether or not said receiving device is compliant with an ADSI protocol extension.

4. A method as claimed in claim 3 further comprising receiving an acknowledgement signal and initiating the transmission of said messages in response to said acknowledgement signal.

5. A method as claimed in claim 4 further comprising receiving an acknowledgement signal before transmitted a subsequent message.

6. A method as claimed in claim 1 further comprising storing said identifiers in said data record in identification fields corresponding to respective information fragments.

7. A method as claimed in claim 6 further comprising maintaining a table of predefined action codes and including at least one of said action codes in each of said messages, said at least one of said action codes acting as said identifier associated with said information fragment.

8. A method as claimed in claim 1 further comprising transmitting said messages containing said information fragments, in a predefined order.

9. A method as claimed in claim 1 further comprising storing an electronic mail message in said data record.

10. A method as claimed in claim 1 further comprising storing a page message in said data record.

11. A method as claimed in claim 1 further comprising transmitting said messages on a public telephone network.

12. A method of communicating information comprising:
   a) receiving a message having an information fragment and an associated identifier; and
   b) storing said information fragment in a field of a data record identified by its associated identifier;
   c) wherein said received message is in compliance with at least one ADSI protocol extension.

13. A method as claimed in claim 12 further comprising transmitting a dual tone multi-frequency signal in response to receipt of said message.

14. A method as claimed in claim 12 further comprising receiving said message at customer premises equipment in a public telephone network.

15. A method as claimed in claim 12 further comprising receiving a download complete message confirming that the information fragments received comprise all information fragments of said data record and transmitting a pre-defined response signal in response thereto.

16. A method as claimed in claim 15 further comprising storing a record containing said information fragments in non-volatile memory.

17. A method as claimed in claim 12 further comprising transmitting a signal when said message meets a pre-defined criteria.

18. A method as claimed in claim 12 further comprising enabling an editor in response to a pre-defined message.

19. A method of communication information of at least one of e-mail and paging information types to customer premises equipment (CPE), the method comprising:
   a) storing said information as information in a data record, each fragment having an associated identifier;
   b) transmitting a plurality of messages to said CPE, each message having an information fragment and its associated identifier from said data record;
   c) receiving said messages at said CPE; and
   d) regenerating said data record at said CPE from said information fragments and said identifiers received in said messages;
   e) wherein at least one of said messages is transmitted in compliance with at least one ADSI protocol extension.

20. A method as claimed in claim 19 further comprising:
   a) storing other said information at said CPE as information fragments in a CPE data record, each fragment having an associated identifier;
   b) transmitting a plurality of messages to a stored program computer system, each message having an information fragment and its associated identifier from said CPE data record;
   c) receiving said messages at said stored program computer system; and
   d) regenerating said CPE data record at said stored program computer system from said information fragments and said identifiers received in said messages at said stored program computer system.

21. A method as claimed in claim 20 wherein transmitting to said CPE and transmitting to said stored program computer system comprise transmitting on a public telephone network.

22. A method as claimed in claim 20 further comprising transmitting an acknowledgement signal from said CPE to said stored program computer system in response to successful receipt of said message by said CPE.

23. A method as claimed in claim 22 wherein transmitting said acknowledgement signal comprises transmitting a dual tone multi-frequency signal as said acknowledgement signal.

24. An apparatus for communicating information, the apparatus comprising:
  a) a memory for storing said information as information fragments in a data record, each fragment having an associated identifier; and
  b) a transmitter operable to produce and transmit to a receiver a plurality of messages, each message having an information fragment and its associated identifier from said data record;
  c) wherein said transmitter is operable to transmit at leas tone of said messages in compliance with at least one ADSI protocol extension.

25. An apparatus as claimed in claim 24 wherein said transmitter is operable to transmit a query message to query whether or not said receiver is ready to receive said messages.

26. An apparatus as claimed in claim 25 wherein said transmitter is operable to transmit a query message to query whether or not said receiver is compliant with an ADSI protocol extension.

27. An apparatus as claimed in claim 26 further comprising an acknowledgement signal receiver operable to receive an acknowledgement signal and wherein said transmitter is operable to transmit said messages in response to said acknowledgement signal.

28. An apparatus as claimed in claim 27 wherein said acknowledgement signal receiver is operable to receive an acknowledgement signal before enabling said transmitter to transmit a subsequent message.

29. An apparatus as claimed in claim 27 further comprising a processor programmed to store said identifiers in said data record in identification fields corresponding to respective information fragments.

30. An apparatus as claimed in claim 29 wherein said processor is programmed to maintain a table of predefined action codes and to include at least one of said action codes in each of said messages, said at least one of said action codes acting as said identifier associated with said information fragment.

31. An apparatus as claimed in claim 27 wherein said processor is programmed to direct said transmitter to transmit said messages containing said information fragments, in a predefined order.

32. An apparatus as claimed in claim 24 wherein said memory is operable to store an electronic mail message in said data record.

33. An apparatus as claimed in claim 24 wherein said memory is operable to store a page message in said data record.

34. An apparatus as claimed in claim 24 wherein said transmitter is operable to transmit said message on a public telephone network.

35. An apparatus for communicating information, the apparatus comprising:
  a) a receiver for receiving a message having an information fragment and an association identifier; and
  b) a memory in communication with said receiver for storing said information fragment in a field of a data record identified by its associated identifier.

36. An apparatus as claimed in claim 35 further comprising a transmitter for transmitting a dual tone multi-frequency signal in response to receipt of said message.

37. An apparatus as claimed in claim 36 wherein said transmitter is operable to transmit information in transmit messages in response to receipt of a pre-defined receive message, each of said transmit messages having an information fragment and an associated identifier.

38. An apparatus as claimed in claim 37 wherein said receiver is operable to receive said receive messages in a first pre-defined communications protocol.

39. An apparatus as claimed in claim 38 wherein said transmitter is operable to transmit said transmit messages in accordance with a communications protocol other than the protocol in which said receive message was received.

40. An apparatus as claimed in claim 35 wherein said receiver is operable to receive messages at customer premises equipment in a public telephone network.

41. An apparatus as claimed in claim 35 further comprising non-volatile memory for storing a data record containing said information fragments.

42. An apparatus as claimed in claim 36 wherein said transmitter is operable to transmit a signal when said message meets a pre-defined criterion.

43. An apparatus as claimed in claim 35 further comprising an editor enabled in response to a pre-defined receive message.

44. An apparatus for communicating information of a least one of e-mail and paging information types to customer premises equipment (CPE), the apparatus comprising:
  a) a memory for storing said information as information fragments in a data record, each fragment having an associated identifier;
  b) a transmitter operable to transmit a plurality of messages to said CPE, each message having an information fragment and its associated identifier from said data record;
  c) a receiver at said CPE for receiving said messages; and
  d) a processor in communication with said receiver for regenerating said data record at said CPE from said information fragments and their identifiers received in said messages;
  e) wherein said transmitter is operable to transmit at least one of said messages in compliance with at least one ADSI protocol extension.

45. An apparatus as claimed in claim 44 further comprising:
  a) a memory at said CPE for storing other said information at said CPE as information fragments in a CPE data record, each fragment having an associated identifier;
  b) a transmitter at said CPE for transmitting a plurality of messages to a stored program computer system, each message having an information fragment and its associated identifier from said CPE data record;
  c) a receiver at said stored program computer system for receiving said messages; and
  d) a processor in communication with said receiver at said stored program computer system for regenerating said CPE data record at said stored program computer system from said information fragments and said identifiers received in said messages at said stored program computer system.

46. An apparatus as claimed in claim 45 wherein said transmitters are operable to transmit said messages on a public telephone network.

47. An apparatus as claimed in claim 45 wherein said transmitter at said CPE is operable to transmit an acknowledgement signal from said CPE to said stored program computer system in response to successful receipt of said data record.

48. An apparatus as claimed in claim 47 wherein said transmitter at said CPE is operable to transmit a dual tone multi-frequency signal as said acknowledgement signal.

* * * * *